United States Patent
Cutler

(10) Patent No.: US 7,599,751 B2
(45) Date of Patent: Oct. 6, 2009

(54) ADAPTIVE MULTIVARIABLE MPC CONTROLLER WITH LP CONSTRAINTS

(75) Inventor: Charles R. Cutler, San Antonio, TX (US)

(73) Assignee: Cutler Technology Corporation, Bourne, TX (US)

( * ) Notice: Subject to any disclaimer, the term of this patent is extended or adjusted under 35 U.S.C. 154(b) by 52 days.

(21) Appl. No.: 11/581,117

(22) Filed: Oct. 13, 2006

(65) Prior Publication Data

US 2008/0188957 A1    Aug. 7, 2008

(51) Int. Cl.
*G05B 13/02*    (2006.01)

(52) U.S. Cl. .............................. 700/38; 700/30; 700/42; 700/266

(58) Field of Classification Search ................... 700/38, 700/42, 19, 266, 33, 44
See application file for complete search history.

(56) References Cited

U.S. PATENT DOCUMENTS

| | | |
|---|---|---|
| 4,349,869 A | 9/1982 | Prett et al. |
| 4,616,308 A | 10/1986 | Morshedi et al. |
| 5,347,446 A | 9/1994 | Iino et al. |
| 5,566,065 A | 10/1996 | Hansen et al. |
| 5,568,378 A | 10/1996 | Wojsznis |
| 6,056,781 A | 5/2000 | Wassick et al. |
| 6,088,630 A | 7/2000 | Cawlfield et al. |
| 2003/0195665 A1 * | 10/2003 | Cutler .......................... 700/266 |

OTHER PUBLICATIONS

Patry, et al. ; Model Predictive Controller Design with Process Constraints and implicit Economic Criteria. IEEE Instr. & Meas. Tech. Conf. May 1997. pp. 559-563.

* cited by examiner

*Primary Examiner*—Kidest Bahta
*Assistant Examiner*—Nathan Laughlin
(74) *Attorney, Agent, or Firm*—M.A. Ervin & Associates; Michael A. Ervin

(57) ABSTRACT

A method is disclosed for developing and using a high-speed adaptive multivariable controller by removing the dynamics of the PID controllers from a Model Predictive Controller that was developed using identification testing of a process. The resulting multivariable controller, based on final control elements as the manipulated variables is then used in a novel control adaptation with all of the PID controllers switched to manual.

16 Claims, 11 Drawing Sheets

ADAPTIVE MULTIVARIABLE MPC CONTROLLER WITH LP CONSTRAINTS

BACKGROUND OF THE INVENTION

Model Predictive Control (MPC) refers to a class of algorithms that compute a sequence of manipulated variable adjustments in order to optimize the future behavior of complex multivariable processes. Originally developed to meet the needs of petroleum refineries and chemical processes, MPC can now be found in a wide variety of application areas including chemicals, food processing, automotive, aerospace, metallurgy, and pulp and paper. A well-known implementation of MPC in chemical and refinery applications is Dynamic Matrix Control or DMC.

The MPC Controller employs a software model of the process to predict the effect of past changes of manipulated variable and measurable disturbances on the output variables of interest. The independent variables are computed so as to optimize future system behavior over a time interval known as the prediction horizon. In the general case any desired objective function can be used for the optimization. The system dynamics are described by an explicit process model, which can take, in principle, a number of different mathematical forms. Process input and output constraints are included directly in the problem formulation so that future constraint violations are anticipated and prevented.

In practice a number of different approaches have been developed and commercialized in implementing MPC Controllers. The most successful implementations have made use of a linear model for the plant dynamics. The linear model is developed in a first step by gathering data on the process by introducing test disturbances on the independent (manipulated) variables and measuring the effects of the disturbances on the dependent (controlled) variables. This initial step is referred to as identification.

U.S. Pat. Nos. 4,349,869 and 4,616,308 describe an implementation of MPC control called Dynamic Matrix Control (DMC). These patents describe the MPC algorithms based on linear models of a plant and describe how process constraints are included in the problem formulation. Initial identification of the MPC controller using process data is also described.

By way of further background this identification of process dynamics requires a pre-test in which the manipulated variables of the process are moved in some pattern to determine the effect on the dependent (controlled) variables. In a chemical or refinery process the independent variables include the PID (proportional-integral-derivative) controller set points for selected dependent variables, the final control element positions of PID controllers in manual, and temperatures, material flows, pressures and compositions that are determined outside the scope of the controller's domain. For any process Identification test, the independent variables are fixed for the analysis of the data. Further the tuning of any of the PID controllers in the domain of the MPC controller is fixed. The MPC controller that is built to use the dynamic process models from the identification must have exactly the same configuration of independent variables that existed when the identification was performed. Thus the PID controller configuration that is present during identification imbeds the PID controller dynamics in the dynamic model. Because the PID dynamics are a part of the plant behavior there is an inherent correlation of variables that happens as unmeasured disturbances occur in the process. The various PID control loops respond to those unmeasured disturbances and move many of the controlled variables in response. This has historically always prevented practitioners from creating MPC controllers free of the PID dynamics using standard identification tests.

U.S. application Ser. No. 10/047,473 by the inventor is incorporated by reference into this application in its entirety. This application addresses the aforementioned issue and describes a methodology for removing the PID dynamics from the dynamic model by use of a novel mathematical matrix algorithm that interchanges selected final control element position (usually valve positions) controlled variables with their corresponding selected independently controllable, manipulated PID controller set point variables in the linearized model using matrix row elimination mathematics to generate a second linearized model that has a new set of independently controllable, manipulated variables, the second model having the dynamics of the selected independently controllable, manipulated PID controller set point variables removed from the model. This second linearized model is an open loop model based on final control element positions only. Because it is an open loop finite impulse response model it has been shown that it can run 50 to 100 times faster than real time. Application Ser. No. 10/047,473 describes and claims the use of this type of model in both control and in the development of off-line training simulators.

A greatly desired but unmet need in the control of complex multivariable processes such as chemical manufacturing and oil refining is the use of an adaptive controller. In the past, adding an adaptive mechanism to MPC has been approached in a number of ways. Researchers have primarily focused on updating the internal process model used in the control algorithm. Several articles review various adaptive control mechanisms for controlling nonlinear processes (Seborg, Edgar, & Shah, 1986; Bequette, 1991; Di Marco, Semino, & Brambilla, 1997). In addition, Qin and Badgwell (2000) provide a good overview of nonlinear MPC applications that are currently available in industry. As illustrated by these works, the adaptive control mechanisms consider the use of a nonlinear analytical model, combinations of linear empirical models or some mixture of both.

MPC using nonlinear models is likely to become more common as users demand higher performance and new software tools make nonlinear models more readily available. Developing adequate nonlinear empirical models is very challenging, however. There is no model form that is clearly suitable to represent general nonlinear processes. From a theoretical point of view using a nonlinear model changes the control problem from a convex QP to a non-convex Non-Linear Program (NLP), the solution of which is much more difficult. There is no guarantee, for example, that the global optimum can be found. It is important to note that because of these factors none of these non-linear approaches have been successfully implemented commercially on large-scale controllers.

An alternative approach would be to use first-principles models developed from well-known mass, momentum, and energy conservation laws. However, the cost of developing a reasonably accurate first-principles model is likely to be prohibitive until new software tools and validation procedures become available.

A desirable solution though would be an adaptive controller based on linear MPC type models such as dynamic matrix control (DMC) models. This approach would be highly desirable to a control practitioner who is already conversant with the use of DMC type control. The current inventor proposed this solution in U.S. Pat. No. 7,447,554, which is incorporated herein by reference.

The use of such an adaptive controller based on a linear MPC type of model can now be used to address a problem that often arises in multivariable controllers, that is the difficulty of control when the multivariable controller's associated linear program becomes infeasible. The set-points of modern control systems are often provided by the solution of an associated linear program that is being used to optimize the process economics. When the associated linear program becomes infeasible it can input radical changes to the multivariable controller as set points, which can cause significant disruption to the process. It has been found that constraining the out of control set points to pre-defined operating limits when the prediction of the dependent variables are outside their limits instead of set points from the infeasible linear program can eliminate the error attributed to dependent variable predictions.

The recognition of this unmet need and a method of addressing the need by use of an open loop finite impulse response model with the PID set points and replaced with final control element positions coupled with an adaptive control methodology, as well as a method of limiting the range of set point adjustments from the linear program is an aspect of this invention.

BRIEF SUMMARY OF THE INVENTION

The inventive concept can be described as follows: First a method is employed to remove the dynamics of the PID controllers from the MPC controller that was created by a plant identification test. This enables the creation of a final control element based open loop FIR model of the process. This model is then used to build an adaptive multivariable controller.

It is a further aspect of this invention to provide such a method that can be used in various implementations of MPC controllers.

It is a further aspect of this invention to provide a method to create such an adaptive controller for complex multivariable processes that can be modified with new regulatory control configurations or new tuning and to do so without having to conduct new identification testing of the process.

It is a further aspect of this invention to provide a method of creating an off-line simulator based on the adaptive model of this invention.

It is a further aspect of this invention to provide a method of creating an on-line operator advisor based on the adaptive model of this invention.

An object of the invention is achieved by a method for controlling a process having a plurality of independently controllable, manipulated variables, some of which are provided by the solution to a separate linear program, and at least one controlled variable dependent upon the independently controllable, manipulated variables comprising the steps of: gathering data about the process by separately introducing test disturbances in each of the manipulated variables and measuring the effect of the disturbances on the controlled variable; using the effects of the disturbances on the controlled variable to generate a first linearized dynamic model relating the at least one controlled variable to the independently controllable, manipulated variables; interchanging the final control position controlled variables with their corresponding selected independently controllable, manipulated PID controller set point variables in the first linearized dynamic model using matrix row elimination mathematics to generate a second linearized dynamic model that has a new set of independently controllable, manipulated variables, the second linearized dynamic model having the dynamics of the selected independently controllable, manipulated PID controller set point variables removed from the second linearized dynamic model; measuring the present value of the variables; pre-setting operating limits for the at least one controlled variable; pre-setting test limits for the at least one controlled variable that fall within the operating limits; using the second linearized dynamic model to calculate a first set of prediction vectors for the at least one controllable variable; placing the second linearized dynamic model in an adaptive test mode wherein all of the PID controllers are switched to manual; perturbing the final control element manipulated variables with random excitation signals; calculating for discrete intervals of time from the gathered data about the process, the measured present values and pre-selected operating constraints a set of moves for present and future times for at least the manipulated variables to obtain new values for the manipulated variables and to move the at least one dependent controllable variable towards at least one of the constraints; when the linear program solution is infeasible, setting each PID set-point that is outside of its corresponding pre-set operating limits at said corresponding pre-set operating limits; and when the prediction vector is outside of test limits for the at least one controlled variable, changing the process by adjusting the manipulated variables for the set of moves for present and future times to cause the process to move the at least one dependent controllable variable towards at least one of the constraints.

Another aspect of the invention is a method for creating an off-line process simulator for use in process simulation and for training simulators for a process by use of the adaptive multivariable controller model created by the methods just described comprising the steps of: porting the adaptive multivariable controller model to any computer; coupling regulatory control schemes to the adaptive multivariable controller model via mathematical emulators to emulate PID controllers in manual, cascade, or automatic modes; initializing the completed model with initial conditions; and mathematically solving the completed model to predict future variable states.

Another aspect of the invention is a method for creating an on-line operator advisor for use in process simulation and for training simulators for a process by use of the adaptive multivariable controller model created by the methods described above comprising the steps of: coupling regulatory control schemes to the adaptive multivariable controller model via mathematical emulators to emulate PID controllers in manual, cascade, or automatic modes; accessing real time data from the process to initialize the completed model with the state of the manipulated and controlled variables; initializing the configuration and tuning of the regulatory control system; initializing with the state of the open loop final control element prediction vectors; and mathematically solving the completed model to predict the future path of the at least one controlled variable.

The most common method of Identification currently used in oil refining and chemical processes is the Dynamic Matrix Identification (DMI). DMI will be used to illustrate the methodology of this invention, but it should be understood that the invention is not limited to a specific Identification technique.

DETAILED DESCRIPTION OF INVENTION

Figure 1:
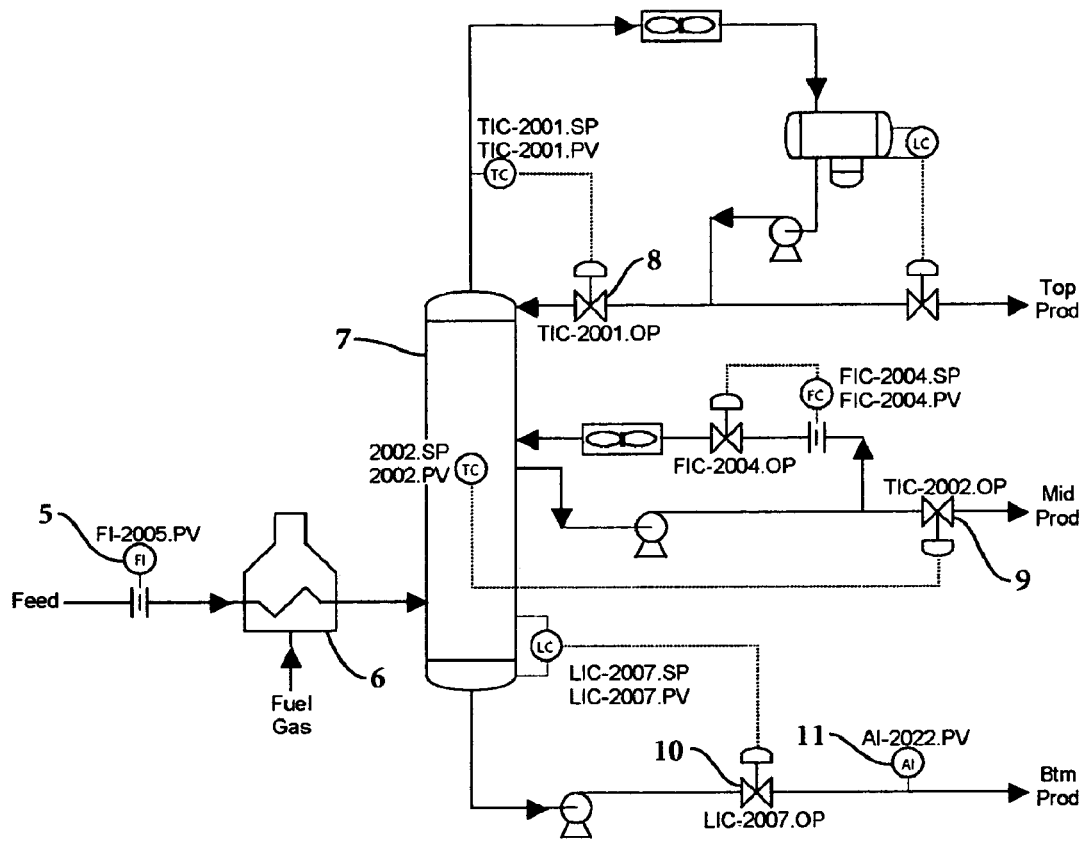
FIG. 1 is a flow schematic of a fractionator.

The invention is a method used in conjunction with model predictive control for removing the dynamics of PID controllers from an MPC controller of a process in order to subsequently create an adaptive multivariable controller.

An MPC process model is a set of linear equations so it should be mathematically possible to interchange any independent variable with a dependent variable provided a relation exists between the independent and dependent variable. A candidate set for that transformation is the set point (independent) for a PID controller and the associated final control element position (dependent) for that PID controller.

An MPC controller is often based on a linear model of a process system. Although the invention to be described here has applications in many fields the examples used will be from chemical and refinery process applications.

There are two types of variables in any system; the independent variables and the dependent variables. The independent variables are inputs to the system. The independent variables are further divided into manipulated and disturbance (feedforward) variables. Manipulated variables are those that can be changed by the human operator, such as final control element positions or PID controller set points. Disturbance variables are those independent variables that have an effect on the system, but cannot be changed by the human operator. Variables such as feed composition, feed temperature, and ambient temperature are examples of disturbance variables.

Dependent variables are outputs from the system. They are also called controlled variables and those two terms are used interchangeably in this discussion. Dependent variables are affected by changes in the independent variables. The human operator cannot directly change them. The values of dependent variables can be controlled, however, by correctly changing the values of the manipulated variables. Further, as disturbances enter the system, the manipulated variables must be correctly adjusted to counteract the disturbance.

The use of linear models allows the use of matrix mathematics in describing complex and multivariable control. There are several general formulations of MPC models. A general model for control is the step response model:

$$\delta \overline{O}_1 = A_{1,1} \Delta \overline{I}_1 + \cdots + A_{1,j} \Delta \overline{I}_j + \cdots + A_{1,nind} \Delta \overline{I}_{nind}$$
$$\vdots \qquad \vdots \qquad \vdots$$
$$\delta \overline{O}_i = A_{i,1} \Delta \overline{I}_1 + \cdots + A_{i,j} \Delta \overline{I}_j + \cdots + A_{i,nind} \Delta \overline{I}_{nind}$$
$$\vdots \qquad \vdots \qquad \vdots$$
$$\delta \overline{O}_{ndep} = A_{ndep,1} \Delta \overline{I}_1 + \cdots + A_{ndep,j} \Delta \overline{I}_j + \cdots + A_{ndep,nind} \Delta \overline{I}_{nind}$$

Equation 1: Step Response Dynamic Matrix, Block Matrix Form where, $$\delta \overline{O}_i = \begin{bmatrix} O_{i,1} - O_{i,0} \\ O_{i,2} - O_{i,0} \\ O_{i,3} - O_{i,0} \\ \vdots \\ O_{o,ncoef} - O_{i,0} \end{bmatrix},$$

the accumulative change in the $i^{th}$ dependent variable at each time step, $$\Delta \overline{I}_j = \begin{bmatrix} \Delta I_{j,1} \\ \Delta I_{j,2} \\ \Delta I_{j,3} \\ \vdots \\ \Delta I_{j,ncoef} \end{bmatrix},$$

the step change in the $j^{th}$ independent variable at each time step, and $$A_{i,j} = \begin{bmatrix} a_{i,j,1} & & & & \\ a_{i,j,2} & a_{i,j,1} & & & \\ a_{i,j,3} & a_{i,j,2} & a_{i,j,1} & & \\ \vdots & \vdots & \vdots & \ddots & \\ a_{i,j,ncoef} & a_{i,j,(ncoef-1)} & a_{i,j,(ncoef-2)} & \cdots & a_{i,j,1} \end{bmatrix},$$

the Dynamic Matrix.

An alternate form of this Step Response equation is the Finite Impulse Response (FIR) form. It can be derived from the Step Response form as described below.

Recalling from the definitions that:

$$b_{i,j,k} = a_{i,j,k} \text{ for } k=1,$$

$$b_{i,j,k} = a_{i,j,k} - a_{i,j,(k-1)} \text{ for } k:2 \rightarrow ncoef$$

and that $$\Delta O_{i,k} = O_{i,k} - O_{i,(k-1)} \text{ for } k:1 \rightarrow ncoef$$

we can difference the above system of equations to give:

$$\Delta \overline{O}_1 = B_{1,1} \Delta \overline{I}_1 \cdots + B_{i,j} \Delta \overline{I}_j \cdots + B_{1,nind} \Delta \overline{I}_{nind}$$
$$\vdots \quad \vdots \quad \vdots \qquad \vdots \qquad \vdots$$
$$\Delta \overline{O}_i = B_{1,1} \Delta \overline{I}_1 \cdots + B_{i,j} \Delta \overline{I}_j \cdots + B_{i,nind} \Delta \overline{I}_{nind}$$
$$\vdots \quad \vdots \quad \vdots \qquad \vdots \qquad \vdots$$
$$\Delta \overline{O}_{ndep} \quad B_{ndep,1} \Delta \overline{I}_1 \cdots + B_{ndep,j} \Delta \overline{I}_j \cdots + B_{ndep,nind} \Delta \overline{I}_{nind}$$

Equation 2: Finite Impulse Response Equations—Block Matrix Form where $$\Delta \overline{O}_i = \begin{bmatrix} O_{i,1} - O_{i,0} \\ O_{i,2} - O_{i,1} \\ O_{i,3} - O_{i,2} \\ \vdots \\ O_{i,ncoef} - O_{i(ncoef-1)} \end{bmatrix},$$

the change in the $i^{th}$ dependent variable across each time interval, $$\Delta \overline{I}_j = \begin{bmatrix} \Delta I_{j,1} \\ \Delta I_{j,2} \\ \Delta I_{j,3} \\ \vdots \\ \Delta I_{j,ncoef} \end{bmatrix}$$

as above, and $$B_{i,j} = \begin{bmatrix} b_{i,j,1} & & & & \\ b_{i,j,2} & b_{i,j,1} & & & \\ b_{i,j,3} & b_{i,j,2} & b_{i,j,1} & & \\ \vdots & \vdots & \vdots & \ddots & \\ b_{i,j,ncoef} & b_{i,j(ncoef-1)} & b_{i,j,(ncoef-2)} & \cdots & b_{i,j,1} \end{bmatrix},$$

the model matrix of Impulse Coefficients.

There are five forms of these equations, and we have shown only the first two. While these forms are mathematically equivalent, and while all forms may be used for identification prediction and control, they have very different properties.

$\delta \overline{O} = A \Delta \overline{I}$—Most often used for control calculations.
$\Delta \overline{O} = B \Delta \overline{I}$—Used for identification of steady state variables.
$\Delta \Delta \overline{O} = B \Delta \Delta \overline{I}$—Used for identification of ramp variables.
$\delta \overline{O} = B \delta \overline{I}$—Not commonly used. Old IDCOM control formulation.
$\Delta \overline{O} = A \Delta \Delta \overline{I}$—Not commonly used.

C. R. Cutler and C. R. Johnston discuss the properties of these forms of the matrix in a paper, "Analysis of the Forms of the Dynamic Matrix", in the Proceedings of the Instrument Society of America ISA 85 Advances in Instrumentation Volume 40, Number 1—October 1985.

The use of these linear modeling techniques, including the identification of the model and the use of the model for control and the use in control with constraints is described in two U.S. Pat. Nos., 4,349,869 and 4,616,308. These patents are incorporated herein by reference.

We will now derive the algorithm of this invention to demonstrate the removal of the PID (proportional-integral-derivative) dynamics from the controller. The derivation is from the FIR model of equation 2. To derive the algorithm, we assume that the $\hat{j}^{th}$ independent variable is the set point of a PID controller and the $\hat{i}^{th}$ dependent is the PID final control element response to that set point change. The final control element in many processes can be a valve but it can be other things such as the speed setting on a motor, or a flow rate associated with the valve. The term final control element anticipates any of those elements that are responsive to a PID control loop. We wish to re-constitute the model so that the final control element is the independent variable in the process model; that is to say, we wish to remove the dynamics of this PID controller from all affected model responses. This can be accomplished by interchanging the $\hat{i}^{th}$ dependent variable with the $\hat{j}^{th}$ dependent variable, as follows:

$$\begin{bmatrix} B_{1,1} & \cdots & B_{1,(\hat{j}-1)} & B_{1,\hat{j}} & B_{1,(\hat{j}+1)} & \cdots & B_{1,nind} \\ \vdots & \ddots & \vdots & \vdots & \vdots & \ddots & \vdots \\ B_{(\hat{i}-1),1} & \cdots & B_{(\hat{i}-1),(\hat{j}-1)} & B_{(\hat{i}-1),\hat{j}} & B_{(\hat{i}-1),(\hat{j}+1)} & \cdots & B_{(\hat{i}-1),nind} \\ B_{\hat{i},1} & \cdots & B_{\hat{i},(\hat{j}-1)} & B_{\hat{i},\hat{j}} & B_{\hat{i},(\hat{j}+1)} & \cdots & B_{\hat{i},nind} \\ B_{(\hat{i}+1),1} & \cdots & B_{(\hat{i}+1),(\hat{j}-1)} & B_{(\hat{i}+1),\hat{j}} & B_{(\hat{i}+1),(\hat{j}+1)} & \cdots & B_{(\hat{i}+1),nind} \\ \vdots & \ddots & \vdots & \vdots & \vdots & \ddots & \vdots \\ B_{ndep,1} & \cdots & B_{ndep,(\hat{j}-1)} & B_{ndep,\hat{j}} & B_{ndep,(\hat{j}+1)} & \cdots & B_{ndep,nind} \end{bmatrix} \times$$

$$\begin{bmatrix} \Delta \overline{I}_1 \\ \vdots \\ \Delta \overline{I}_{(\hat{j}-1)} \\ \Delta \overline{I}_{\hat{j}} \\ \Delta \overline{I}_{(\hat{j}+1)} \\ \vdots \\ \Delta \overline{I}_{nind} \end{bmatrix} = \begin{bmatrix} I & \cdots & 0 & 0 & 0 & \cdots & 0 \\ \vdots & \ddots & \vdots & \vdots & \vdots & \ddots & \vdots \\ 0 & \ddots & I & 0 & 0 & \ddots & 0 \\ 0 & \ddots & 0 & I & 0 & \ddots & 0 \\ 0 & \ddots & 0 & 0 & I & \ddots & 0 \\ \vdots & \ddots & \vdots & \vdots & \vdots & \ddots & \vdots \\ 0 & \cdots & 0 & 0 & 0 & \cdots & I \end{bmatrix} \times \begin{bmatrix} \Delta \overline{O}_1 \\ \vdots \\ \Delta \overline{O}_{(\hat{i}-1)} \\ \Delta \overline{O}_{\hat{i}} \\ \Delta \overline{O}_{(\hat{i}+1)} \\ \vdots \\ \Delta \overline{O}_{ndep} \end{bmatrix} \text{ where } I =$$

$$\begin{bmatrix} 1 & 0 & \cdots & 0 & 0 \\ 0 & 1 & \ddots & 0 & 0 \\ \vdots & & \ddots & & \vdots \\ 0 & 0 & \ddots & 1 & 0 \\ 0 & 0 & \cdots & 0 & 1 \end{bmatrix},$$

the Identity Matrix.

Note that this is nothing more than equation 2 above with an Identity matrix multiplying the $\Delta O$'s.

By performing row elimination operations (pivoting), we get;

$$\begin{bmatrix} \hat{B}_{1,1} & \cdots & \hat{B}_{1,(\hat{j}-1)} & 0 & \hat{B}_{1,(\hat{j}+1)} & \cdots & \hat{B}_{1,nind} \\ \vdots & \ddots & \vdots & \vdots & \vdots & \ddots & \vdots \\ \hat{B}_{(\hat{i}-1),1} & \cdots & \hat{B}_{(\hat{i}-1),(\hat{j}-1)} & 0 & \hat{B}_{(\hat{i}-1),(\hat{j}+1)} & \cdots & \hat{B}_{(\hat{i}-1),nind} \\ \hat{B}_{\hat{i},1} & \cdots & \hat{B}_{\hat{i},(\hat{j}-1)} & -I & \hat{B}_{\hat{i},(\hat{j}+1)} & \cdots & \hat{B}_{\hat{i},nind} \\ \hat{B}_{(\hat{i}+1),1} & \cdots & \hat{B}_{(\hat{i}+1),(\hat{j}-1)} & 0 & \hat{B}_{(\hat{i}+1),(\hat{j}+1)} & \cdots & \hat{B}_{(\hat{i}+1),nind} \\ \vdots & \ddots & \vdots & \vdots & \vdots & \ddots & \vdots \\ \hat{B}_{ndep,1} & \cdots & \hat{B}_{ndep,(\hat{j}-1)} & 0 & \hat{B}_{ndep,(\hat{j}+1)} & \cdots & \hat{B}_{ndep,nind} \end{bmatrix} \times$$

$$\begin{bmatrix} \Delta \bar{I}_1 \\ \vdots \\ \Delta \bar{I}_{(\hat{j}-1)} \\ \Delta \bar{I}_{\hat{j}} \\ \Delta \bar{I}_{(\hat{j}+1)} \\ \vdots \\ \Delta \bar{I}_{nind} \end{bmatrix} = \begin{bmatrix} I & \cdots & 0 & -\hat{B}_{1,\hat{j}} & 0 & \cdots & 0 \\ \vdots & \ddots & \vdots & \vdots & \vdots & \ddots & \vdots \\ 0 & \ddots & I & -\hat{B}_{(\hat{i}-1),\hat{j}} & 0 & \ddots & 0 \\ 0 & \ddots & 0 & -\hat{B}_{\hat{i},\hat{j}} & 0 & \ddots & 0 \\ 0 & \ddots & 0 & -\hat{B}_{(\hat{i}+1),\hat{j}} & I & \ddots & 0 \\ \vdots & \ddots & \vdots & \vdots & \vdots & \ddots & \vdots \\ 0 & \cdots & 0 & -\hat{B}_{ndep,\hat{j}} & 0 & \cdots & I \end{bmatrix} \times \begin{bmatrix} \Delta \bar{O}_1 \\ \vdots \\ \Delta \bar{O}_{(\hat{i}-1)} \\ \Delta \bar{O}_{\hat{i}} \\ \Delta \bar{O}_{(\hat{i}+1)} \\ \vdots \\ \Delta \bar{O}_{ndep} \end{bmatrix}$$

Which can be re-written as:

$$\begin{bmatrix} \hat{B}_{1,1} \\ \vdots \\ \hat{B}_{(\hat{i}-1),1} \\ \hat{B}_{\hat{i},1} \\ \hat{B}_{(\hat{i}+1),1} \\ \vdots \\ \hat{B}_{ndep,1} \end{bmatrix} \times \Delta \bar{I}_1 + \ldots + \begin{bmatrix} \hat{B}_{1,(\hat{j}-1)} \\ \vdots \\ \hat{B}_{(\hat{i}-1),(\hat{j}-1)} \\ \hat{B}_{\hat{i},(\hat{j}-1)} \\ \hat{B}_{(\hat{i}+1),(\hat{j}-1)} \\ \vdots \\ \hat{B}_{ndep,(\hat{j}-1)} \end{bmatrix} \times \Delta \bar{I}_{(\hat{j}-1)} + \begin{bmatrix} 0 \\ \vdots \\ 0 \\ -I \\ 0 \\ \vdots \\ 0 \end{bmatrix} \times \Delta \bar{I}_{\hat{j}} +$$

$$\begin{bmatrix} \hat{B}_{1,(\hat{j}+1)} \\ \vdots \\ \hat{B}_{(\hat{i}-1),(\hat{j}+1)} \\ \hat{B}_{\hat{i},(\hat{j}+1)} \\ \hat{B}_{(\hat{i}+1),(\hat{j}+1)} \\ \vdots \\ \hat{B}_{ndep,(\hat{j}+1)} \end{bmatrix} \times \Delta \bar{I}_{(\hat{j}+1)} \ldots + \begin{bmatrix} \hat{B}_{1,nind} \\ \vdots \\ \hat{B}_{(\hat{i}-1),nind} \\ \hat{B}_{\hat{i},nind} \\ \hat{B}_{(\hat{i}+1),nind} \\ \vdots \\ \hat{B}_{ndep,nind} \end{bmatrix} \times \Delta \bar{I}_{nind} = \begin{bmatrix} I \\ \vdots \\ 0 \\ 0 \\ 0 \\ \vdots \\ 0 \end{bmatrix} \times \Delta \bar{O}_1 +$$

$$\ldots + \begin{bmatrix} 0 \\ \vdots \\ I \\ 0 \\ 0 \\ \vdots \\ 0 \end{bmatrix} \times \Delta \bar{O}_{(\hat{i}-1)} + \begin{bmatrix} -\hat{B}_{1,\hat{j}} \\ \vdots \\ -\hat{B}_{(\hat{i}-1),\hat{j}} \\ -\hat{B}_{\hat{i},\hat{j}} \\ -\hat{B}_{(\hat{i}+1),\hat{j}} \\ \vdots \\ -\hat{B}_{ndep,\hat{j}} \end{bmatrix} \times \Delta \bar{O}_{\hat{i}} + \begin{bmatrix} 0 \\ \vdots \\ 0 \\ 0 \\ I \\ \vdots \\ 0 \end{bmatrix} \times \Delta \bar{O}_{(\hat{i}+1)} +$$

$$\ldots + \begin{bmatrix} 0 \\ \vdots \\ 0 \\ 0 \\ 0 \\ \vdots \\ I \end{bmatrix} \times \Delta \bar{O}_{ndep}$$

Which can be rearranged to;

$$\begin{bmatrix} \hat{B}_{1,1} \\ \vdots \\ \hat{B}_{(\hat{i}-1),1} \\ \hat{B}_{\hat{i},1} \\ \hat{B}_{(\hat{i}+1),1} \\ \vdots \\ \hat{B}_{ndep,1} \end{bmatrix} \times \Delta \bar{I}_1 + \ldots + \begin{bmatrix} \hat{B}_{1,(\hat{j}-1)} \\ \vdots \\ \hat{B}_{(\hat{i}-1),(\hat{j}-1)} \\ \hat{B}_{\hat{i},(\hat{j}-1)} \\ \hat{B}_{(\hat{i}+1),(\hat{j}-1)} \\ \vdots \\ \hat{B}_{ndep,(\hat{j}-1)} \end{bmatrix} \times \Delta \bar{I}_{(\hat{j}-1)} + \begin{bmatrix} \hat{B}_{1,\hat{j}} \\ \vdots \\ \hat{B}_{(\hat{i}-1),\hat{j}} \\ \hat{B}_{\hat{i},\hat{j}} \\ \hat{B}_{(\hat{i}+1),\hat{j}} \\ \vdots \\ \hat{B}_{ndep,\hat{j}} \end{bmatrix} \times \Delta \bar{O}_{\hat{i}} +$$

$$\begin{bmatrix} \hat{B}_{1,(\hat{j}+1)} \\ \vdots \\ \hat{B}_{(\hat{i}-1),(\hat{j}+1)} \\ \hat{B}_{\hat{i},(\hat{j}+1)} \\ \hat{B}_{(\hat{i}+1),(\hat{j}+1)} \\ \vdots \\ \hat{B}_{ndep,(\hat{j}+1)} \end{bmatrix} \times \Delta \bar{I}_{(\hat{j}+1)} \ldots + \begin{bmatrix} \hat{B}_{1,nind} \\ \vdots \\ \hat{B}_{(\hat{i}-1),nind} \\ \hat{B}_{\hat{i},nind} \\ \hat{B}_{(\hat{i}+1),nind} \\ \vdots \\ \hat{B}_{ndep,nind} \end{bmatrix} \times \Delta \bar{I}_{nind} = \begin{bmatrix} I \\ \vdots \\ 0 \\ 0 \\ 0 \\ \vdots \\ 0 \end{bmatrix} \times \Delta \bar{O}_1 + \ldots +$$

$$\begin{bmatrix} 0 \\ \vdots \\ I \\ 0 \\ 0 \\ \vdots \\ 0 \end{bmatrix} \times \Delta \bar{O}_{(\hat{i}-1)} + \begin{bmatrix} 0 \\ \vdots \\ 0 \\ I \\ 0 \\ \vdots \\ 0 \end{bmatrix} \times \Delta \bar{I}_{\hat{j}} + \begin{bmatrix} 0 \\ \vdots \\ 0 \\ 0 \\ I \\ \vdots \\ 0 \end{bmatrix} \times \Delta \bar{O}_{(\hat{i}+1)} + \ldots + \begin{bmatrix} 0 \\ \vdots \\ 0 \\ 0 \\ 0 \\ \vdots \\ I \end{bmatrix} \times \Delta \bar{O}_{ndep}$$

or reassembling the matrix equation we get;

$$\begin{bmatrix} \hat{B}_{1,1} & \cdots & \hat{B}_{1,(\hat{j}-1)} & \hat{B}_{1,\hat{j}} & \hat{B}_{1,(\hat{j}+1)} & \cdots & \hat{B}_{1,nind} \\ \vdots & \ddots & \vdots & \vdots & \vdots & \ddots & \vdots \\ \hat{B}_{(\hat{i}-1),1} & \cdots & \hat{B}_{(\hat{i}-1),(\hat{j}-1)} & \hat{B}_{(\hat{i}-1),\hat{j}} & \hat{B}_{(\hat{i}-1),(\hat{j}+1)} & \cdots & \hat{B}_{(\hat{i}-1),nind} \\ \hat{B}_{\hat{i},1} & \cdots & \hat{B}_{\hat{i},(\hat{j}-1)} & \hat{B}_{\hat{i},\hat{j}} & \hat{B}_{\hat{i},(\hat{j}+1)} & \cdots & \hat{B}_{\hat{i},nind} \\ \hat{B}_{(\hat{i}+1),1} & \cdots & \hat{B}_{(\hat{i}+1),(\hat{j}-1)} & \hat{B}_{(\hat{i}+1),\hat{j}} & \hat{B}_{(\hat{i}+1),(\hat{j}+1)} & \cdots & \hat{B}_{(\hat{i}+1),nind} \\ \vdots & \ddots & \vdots & \vdots & \vdots & \ddots & \vdots \\ \hat{B}_{ndep,1} & \cdots & \hat{B}_{ndep,(\hat{j}-1)} & \hat{B}_{ndep,\hat{j}} & \hat{B}_{ndep,(\hat{j}+1)} & \cdots & \hat{B}_{ndep,nind} \end{bmatrix} \times$$

$$\begin{bmatrix} \Delta \bar{I}_1 \\ \vdots \\ \Delta \bar{I}_{(\hat{j}-1)} \\ \Delta \bar{O}_{\hat{i}} \\ \Delta \bar{I}_{(\hat{j}+1)} \\ \vdots \\ \Delta \bar{I}_{nind} \end{bmatrix} = \begin{bmatrix} I & \cdots & 0 & 0 & 0 & \cdots & 0 \\ \vdots & \ddots & \vdots & \vdots & \vdots & \ddots & \vdots \\ 0 & \ddots & I & 0 & 0 & \ddots & 0 \\ 0 & \ddots & 0 & I & 0 & \ddots & 0 \\ 0 & \ddots & 0 & 0 & I & \ddots & 0 \\ \vdots & \ddots & \vdots & \vdots & \vdots & \ddots & \vdots \\ 0 & \cdots & 0 & 0 & 0 & \cdots & I \end{bmatrix} \times \begin{bmatrix} \Delta \bar{O}_1 \\ \vdots \\ \Delta \bar{O}_{(\hat{i}-1)} \\ \Delta \bar{I}_{\hat{j}} \\ \Delta \bar{O}_{(\hat{i}+1)} \\ \vdots \\ \Delta \bar{O}_{ndep} \end{bmatrix}$$

Note that $\Delta \bar{O}_{\hat{i}}$ and $\Delta \bar{I}_{\hat{j}}$ have been interchanged so that the final control element position is now an independent variable and the PID set point is now a dependent variable. This illustrates removing the PID dynamics from only one PID controller, but the algorithm is clearly general in that multiple independent/dependent variable pairs can be interchanged to remove the dynamics for multiple controllers.

By way of further illustration a numerical example problem will now be illustrated to show how this approach is applied to a model predictive controller to remove the dynamics of a particular PID controller.

Given an FIR model with two (2) independent variables, two (2) dependent variables and four (4) model coefficients, where the second independent variable is the set point of a PID controller and the second dependent variable is the final control element position of the PID controller, we wish to re-constitute the model with the PID final control element position as an independent variable instead of the PID set point. This requires that the dynamics of the PID controller be removed from all system responses according to the algorithm previously discussed. This example is also valid for the $\Delta O = B \Delta I_i$, $\delta O = B \delta I$, and $\Delta \Delta O = B \Delta \Delta I$ forms of the equation.

| Independent Var-1 | Independent Var-2 |
|---|---|
| Dependent Var-1 | |
| $b_{1,1,1} = 1.5$ | $b_{1,2,1} = 0.5$ |
| $b_{1,1,2} = 0.6$ | $b_{1,2,2} = 0.4$ |
| $b_{1,1,3} = 0.2$ | $b_{1,2,3} = 0.2$ |
| $b_{1,1,4} = 0.1$ | $b_{1,2,4} = 0.1$ |
| Dependent Var-2 | |
| $b_{2,1,1} = -0.3$ | $b_{2,2,1} = 0.75$ |
| $b_{2,1,2} = -0.4$ | $b_{2,2,2} = 0.25$ |
| $b_{2,1,3} = -0.1$ | $b_{2,2,3} = 0.15$ |
| $b_{2,1,4} = -0.05$ | $b_{2,2,4} = 0.05$ |

The problem is specified in the matrix below.
Indicates Pivot Element

| 1.5 | 0 | 0 | 0 | 0.5 | 0 | 0 | 0 | 1 | 0 | 0 | 0 | 0 | 0 | 0 | 0 |
|---|---|---|---|---|---|---|---|---|---|---|---|---|---|---|---|
| 0.6 | 1.5 | 0 | 0 | 0.4 | 0.5 | 0 | 0 | 0 | 1 | 0 | 0 | 0 | 0 | 0 | 0 |
| 0.2 | 0.6 | 1.5 | 0 | 0.2 | 0.4 | 0.5 | 0 | 0 | 0 | 1 | 0 | 0 | 0 | 0 | 0 |
| 0.1 | 0.2 | 0.6 | 1.5 | 0.1 | 0.2 | 0.4 | 0.5 | 0 | 0 | 0 | 1 | 0 | 0 | 0 | 0 |
| −0.3 | 0 | 0 | 0 | 0.75 | 0 | 0 | 0 | 0 | 0 | 0 | 0 | 1 | 0 | 0 | 0 |
| −0.4 | −0.3 | 0 | 0 | 0.25 | 0.75 | 0 | 0 | 0 | 0 | 0 | 0 | 0 | 1 | 0 | 0 |
| −0.1 | −0.4 | −0.3 | 0 | 0.15 | 0.25 | 0.75 | 0 | 0 | 0 | 0 | 0 | 0 | 0 | 1 | 0 |
| −0.05 | −0.1 | −0.4 | −0.3 | 0.05 | 0.15 | 0.25 | 0.75 | 0 | 0 | 0 | 0 | 0 | 0 | 0 | 1 |

Multiply Equation-5 by (−1/0.75)

| 1.5 | 0 | 0 | 0 | 0.5 | 0 | 0 | 0 | 1 | 0 | 0 | 0 | 0 | 0 | 0 | 0 |
|---|---|---|---|---|---|---|---|---|---|---|---|---|---|---|---|
| 0.6 | 1.5 | 0 | 0 | 0.4 | 0.5 | 0 | 0 | 0 | 1 | 0 | 0 | 0 | 0 | 0 | 0 |
| 0.2 | 0.6 | 1.5 | 0 | 0.2 | 0.4 | 0.5 | 0 | 0 | 0 | 1 | 0 | 0 | 0 | 0 | 0 |
| 0.1 | 0.2 | 0.6 | 1.5 | 0.1 | 0.2 | 0.4 | 0.5 | 0 | 0 | 0 | 1 | 0 | 0 | 0 | 0 |
| 0.4 | 0 | 0 | 0 | −1 | 0 | 0 | 0 | 0 | 0 | 0 | 0 | −1.333 | 0 | 0 | 0 |
| −0.4 | −0.3 | 0 | 0 | 0.25 | 0.75 | 0 | 0 | 0 | 0 | 0 | 0 | 0 | 1 | 0 | 0 |
| −0.1 | −0.4 | −0.3 | 0 | 0.15 | 0.25 | 0.75 | 0 | 0 | 0 | 0 | 0 | 0 | 0 | 1 | 0 |
| −0.05 | −0.1 | −0.4 | −0.3 | 0.05 | 0.15 | 0.25 | 0.75 | 0 | 0 | 0 | 0 | 0 | 0 | 0 | 1 |

Multiply Equation-5 by 0.5, add it to Equation-1 and replace Equation-1

Multiply Equation-5 by 0.4, add it to Equation-2 and replace Equation-2

Multiply Equation-5 by 0.2, add it to Equation-3 and replace Equation-3

Multiply Equation-5 by 0.1, add it to Equation-4 and replace Equation-4

Multiply Equation-5 by 0.25, add it to Equation-6 and replace Equation-6

Multiply Equation-5 by 0.15, add it to Equation-7 and replace Equation-7

Multiply Equation-5 by 0.05, add it to Equation-8 and replace Equation-8

| 1.7 | 0 | 0 | 0 | 0 | 0 | 0 | 0 | 1 | 0 | 0 | 0 | −0.667 | 0 | 0 | 0 |
|---|---|---|---|---|---|---|---|---|---|---|---|---|---|---|---|
| 0.76 | 1.5 | 0 | 0 | 0 | 0.5 | 0 | 0 | 0 | 1 | 0 | 0 | −0.533 | 0 | 0 | 0 |
| 0.28 | 0.6 | 1.5 | 0 | 0 | 0.4 | 0.5 | 0 | 0 | 0 | 1 | 0 | −0.267 | 0 | 0 | 0 |

|      |      |      |      |    |      |      |     |   |   |   |   |        |        |   |   |
|------|------|------|------|----|------|------|-----|---|---|---|---|--------|--------|---|---|
| 0.14 | 0.2  | 0.6  | 1.5  | 0  | 0.2  | 0.4  | 0.5 | 0 | 0 | 0 | 1 | −0.133 | 0      | 0 | 0 |
| 0.4  | 0    | 0    | 0    | −1 | 0    | 0    | 0   | 0 | 0 | 0 | 0 | −1.333 | 0      | 0 | 0 |
| −0.3 | −0.3 | 0    | 0    | 0  | 0.75 | 0    | 0   | 0 | 0 | 0 | 0 | −0.333 | 1      | 0 | 0 |
| −0.04| −0.4 | −0.3 | 0    | 0  | 0.25 | 0.75 | 0   | 0 | 0 | 0 | 0 | −0.2   | 0      | 1 | 0 |
| −0.03| −0.1 | −0.4 | −0.3 | 0  | 0.15 | 0.25 | 0.75| 0 | 0 | 0 | 0 | −0.067 | 0      | 0 | 1 |

Multiply Equation-6 by (−1/0.75)

|      |      |      |     |    |      |      |     |   |   |   |   |        |        |   |   |
|------|------|------|-----|----|------|------|-----|---|---|---|---|--------|--------|---|---|
| 1.7  | 0    | 0    | 0   | 0  | 0    | 0    | 0   | 1 | 0 | 0 | 0 | −0.667 | 0      | 0 | 0 |
| 0.76 | 1.5  | 0    | 0   | 0  | 0.5  | 0    | 0   | 0 | 1 | 0 | 0 | −0.533 | 0      | 0 | 0 |
| 0.28 | 0.6  | 1.5  | 0   | 0  | 0.4  | 0.5  | 0   | 0 | 0 | 1 | 0 | −0.267 | 0      | 0 | 0 |
| 0.14 | 0.2  | 0.6  | 1.5 | 0  | 0.2  | 0.4  | 0.5 | 0 | 0 | 0 | 1 | −0.133 | 0      | 0 | 0 |
| 0.4  | 0    | 0    | 0   | −1 | 0    | 0    | 0   | 0 | 0 | 0 | 0 | −1.333 | 0      | 0 | 0 |
| 0.4  | 0.4  | 0    | 0   | 0  | −1   | 0    | 0   | 0 | 0 | 0 | 0 | 0.444  | −1.333 | 0 | 0 |
| −0.04| −0.4 | −0.3 | 0   | 0  | 0.25 | 0.75 | 0   | 0 | 0 | 0 | 0 | −0.2   | 0      | 1 | 0 |
| −0.03| −0.1 | −0.4 | −0.3| 0  | 0.15 | 0.25 | 0.75| 0 | 0 | 0 | 0 | −0.067 | 0      | 0 | 1 |

Multiply Equation-5 by 0.5, add it to Equation-2 and replace Equation-2

Multiply Equation-5 by 0.4, add it to Equation-3 and replace Equation-3

Multiply Equation-5 by 0.2, add it to Equation-4 and replace Equation-4

Multiply Equation-5 by 0.25, add it to Equation-7 and replace Equation-7

Multiply Equation-5 by 0.15, add it to Equation-8 and replace Equation-8

|      |      |      |     |    |    |      |     |   |   |   |   |        |        |   |   |
|------|------|------|-----|----|----|------|-----|---|---|---|---|--------|--------|---|---|
| 1.7  | 0    | 0    | 0   | 0  | 0  | 0    | 0   | 1 | 0 | 0 | 0 | −0.667 | 0      | 0 | 0 |
| 0.96 | 1.7  | 0    | 0   | 0  | 0  | 0    | 0   | 0 | 1 | 0 | 0 | −0.311 | −0.667 | 0 | 0 |
| 0.44 | 0.76 | 1.5  | 0   | 0  | 0  | 0.5  | 0   | 0 | 0 | 1 | 0 | −0.089 | −0.533 | 0 | 0 |
| 0.22 | 0.28 | 0.6  | 1.5 | 0  | 0  | 0.4  | 0.5 | 0 | 0 | 0 | 1 | −0.044 | −0.267 | 0 | 0 |
| 0.4  | 0    | 0    | 0   | −1 | 0  | 0    | 0   | 0 | 0 | 0 | 0 | −1.333 | 0      | 0 | 0 |
| 0.4  | 0.4  | 0    | 0   | 0  | −1 | 0    | 0   | 0 | 0 | 0 | 0 | 0.444  | −1.333 | 0 | 0 |
| 0.06 | −0.3 | −0.3 | 0   | 0  | 0  | 0.75 | 0   | 0 | 0 | 0 | 0 | −0.089 | −0.333 | 1 | 0 |
| 0.03 | −0.04| −0.4 | −0.3| 0  | 0  | 0.25 | 0.75| 0 | 0 | 0 | 0 | 0      | −0.2   | 0 | 1 |

Multiply Equation-7 by (−1/0.75)

|      |      |      |     |    |    |      |     |   |   |   |   |        |        |        |   |
|------|------|------|-----|----|----|------|-----|---|---|---|---|--------|--------|--------|---|
| 1.7  | 0    | 0    | 0   | 0  | 0  | 0    | 0   | 1 | 0 | 0 | 0 | −0.667 | 0      | 0      | 0 |
| 0.96 | 1.7  | 0    | 0   | 0  | 0  | 0    | 0   | 0 | 1 | 0 | 0 | −0.311 | −0.667 | 0      | 0 |
| 0.44 | 0.76 | 1.5  | 0   | 0  | 0  | 0.5  | 0   | 0 | 0 | 1 | 0 | −0.089 | −0.533 | 0      | 0 |
| 0.22 | 0.28 | 0.6  | 1.5 | 0  | 0  | 0.4  | 0.5 | 0 | 0 | 0 | 1 | −0.044 | −0.267 | 0      | 0 |
| 0.4  | 0    | 0    | 0   | −1 | 0  | 0    | 0   | 0 | 0 | 0 | 0 | −1.333 | 0      | 0      | 0 |
| 0.4  | 0.4  | 0    | 0   | 0  | −1 | 0    | 0   | 0 | 0 | 0 | 0 | 0.444  | −1.333 | 0      | 0 |
| −0.08| 0.4  | 0.4  | 0   | 0  | 0  | −1   | 0   | 0 | 0 | 0 | 0 | 0.119  | 0.4444 | −1.333 | 0 |
| 0.03 | −0.04| −0.4 | −0.3| 0  | 0  | 0.25 | 0.75| 0 | 0 | 0 | 0 | 0      | −0.2   | 0      | 1 |

Multiply Equation-5 by 0.5, add it to Equation-3 and replace Equation-3

Multiply Equation-5 by 0.4, add it to Equation-4 and replace Equation-4

Multiply Equation-5 by 0.25, add it to Equation-8 and replace Equation-8

| 1.7    | 0     | 0    | 0    | 0  | 0  | 0  | 0    | 1 | 0 | 0 | 0 | −0.667 | 0      | 0      | 0      |
|--------|-------|------|------|----|----|----|------|---|---|---|---|--------|--------|--------|--------|
| 0.96   | 1.7   | 0    | 0    | 0  | 0  | 0  | 0    | 0 | 1 | 0 | 0 | −0.311 | −0.667 | 0      | 0      |
| 0.4    | 0.96  | 1.7  | 0    | 0  | 0  | 0  | 0    | 0 | 0 | 1 | 0 | −0.030 | −0.311 | −0.667 | 0      |
| 0.188  | 0.44  | 0.76 | 1.5  | 0  | 0  | 0  | 0.5  | 0 | 0 | 0 | 1 | 0.003  | −0.089 | −0.533 | 0      |
| 0.4    | 0     | 0    | 0    | −1 | 0  | 0  | 0    | 0 | 0 | 0 | 0 | −1.333 | 0      | 0      | 0      |
| 0.4    | 0.4   | 0    | 0    | 0  | −1 | 0  | 0    | 0 | 0 | 0 | 0 | 0.444  | −1.333 | 0      | 0      |
| −0.08  | 0.4   | 0.4  | 0    | 0  | 0  | −1 | 0    | 0 | 0 | 0 | 0 | 0.119  | 0.444  | −1.333 | 0      |
| 0.01   | 0.06  | −0.3 | −0.3 | 0  | 0  | 0  | 0.75 | 0 | 0 | 0 | 0 | 0.030  | −0.089 | −0.333 | 1      |

Multiply Equation-8 by (−1/0.75)

| 1.7    | 0     | 0    | 0    | 0  | 0  | 0  | 0    | 1 | 0 | 0 | 0 | −0.667 | 0      | 0      | 0      |
|--------|-------|------|------|----|----|----|------|---|---|---|---|--------|--------|--------|--------|
| 0.96   | 1.7   | 0    | 0    | 0  | 0  | 0  | 0    | 0 | 1 | 0 | 0 | −0.311 | −0.667 | 0      | 0      |
| 0.4    | 0.96  | 1.7  | 0    | 0  | 0  | 0  | 0    | 0 | 0 | 1 | 0 | −0.030 | −0.311 | −0.667 | 0      |
| 0.188  | 0.44  | 0.76 | 1.5  | 0  | 0  | 0  | 0.5  | 0 | 0 | 0 | 1 | 0.003  | −0.089 | −0.533 | 0      |
| 0.4    | 0     | 0    | 0    | −1 | 0  | 0  | 0    | 0 | 0 | 0 | 0 | −1.333 | 0      | 0      | 0      |
| 0.4    | 0.4   | 0    | 0    | 0  | −1 | 0  | 0    | 0 | 0 | 0 | 0 | 0.444  | −1.333 | 0      | 0      |
| −0.08  | 0.4   | 0.4  | 0    | 0  | 0  | −1 | 0    | 0 | 0 | 0 | 0 | 0.119  | 0.444  | −1.333 | 0      |
| −0.013 | −0.08 | 0.4  | 0.4  | 0  | 0  | 0  | −1   | 0 | 0 | 0 | 0 | −0.040 | 0.119  | 0.444  | −1.333 |

Multiply Equation-5 by 0.5, add it to Equation-4 and replace Equation-4

| 1.7    | 0     | 0    | 0    | 0  | 0  | 0  | 0  | 1 | 0 | 0 | 0 | −0.667 | 0      | 0      | 0      |
|--------|-------|------|------|----|----|----|----|---|---|---|---|--------|--------|--------|--------|
| 0.96   | 1.7   | 0    | 0    | 0  | 0  | 0  | 0  | 0 | 1 | 0 | 0 | −0.311 | −0.667 | 0      | 0      |
| 0.4    | 0.96  | 1.7  | 0    | 0  | 0  | 0  | 0  | 0 | 0 | 1 | 0 | −0.030 | −0.311 | −0.667 | 0      |
| 0.181  | 0.4   | 0.96 | 1.7  | 0  | 0  | 0  | 0  | 0 | 0 | 0 | 1 | −0.017 | −0.030 | −0.311 | −0.667 |
| 0.4    | 0     | 0    | 0    | −1 | 0  | 0  | 0  | 0 | 0 | 0 | 0 | −1.333 | 0      | 0      | 0      |
| 0.4    | 0.4   | 0    | 0    | 0  | −1 | 0  | 0  | 0 | 0 | 0 | 0 | 0.444  | −1.333 | 0      | 0      |
| −0.08  | 0.4   | 0.4  | 0    | 0  | 0  | −1 | 0  | 0 | 0 | 0 | 0 | 0.119  | 0.444  | −1.333 | 0      |
| −0.013 | −0.08 | 0.4  | 0.4  | 0  | 0  | 0  | −1 | 0 | 0 | 0 | 0 | −0.040 | 0.119  | 0.444  | −1.333 |

Rearrange Equations

| 1.7    | 0     | 0    | 0   | 0.667  | 0      | 0     | 0     | 1 | 0 | 0 | 0 | 0 | 0 | 0 | 0 |
|--------|-------|------|-----|--------|--------|-------|-------|---|---|---|---|---|---|---|---|
| 0.96   | 1.7   | 0    | 0   | 0.311  | 0.667  | 0     | 0     | 0 | 1 | 0 | 0 | 0 | 0 | 0 | 0 |
| 0.4    | 0.96  | 1.7  | 0   | 0.030  | 0.311  | 0.667 | 0     | 0 | 0 | 1 | 0 | 0 | 0 | 0 | 0 |
| 0.181  | 0.4   | 0.96 | 1.7 | 0.017  | 0.030  | 0.311 | 0.667 | 0 | 0 | 0 | 1 | 0 | 0 | 0 | 0 |
| 0.4    | 0     | 0    | 0   | 1.333  | 0      | 0     | 0     | 0 | 0 | 0 | 0 | 1 | 0 | 0 | 0 |
| 0.4    | 0.4   | 0    | 0   | −0.444 | 1.333  | 0     | 0     | 0 | 0 | 0 | 0 | 0 | 1 | 0 | 0 |
| −0.08  | 0.4   | 0.4  | 0   | −0.119 | −0.444 | 1.333 | 0     | 0 | 0 | 0 | 0 | 0 | 0 | 1 | 0 |

The new model coefficients with the PID dynamics removed are as follows:

| Independent Var-1 | Independent Var-2 |
|---|---|
| Dependent Var-1 | |
| $\hat{b}_{1,1,1} = 1.7$ | $\hat{b}_{1,2,1} = 0.667$ |
| $\hat{b}_{1,1,2} = 0.96$ | $\hat{b}_{1,2,2} = 0.311$ |
| $\hat{b}_{1,1,3} = 0.4$ | $\hat{b}_{1,2,3} = 0.030$ |
| $\hat{b}_{1,1,4} = 0.181$ | $\hat{b}_{1,2,4} = 0.017$ |
| Dependent Var-2 | |
| $\hat{b}_{2,1,1} = 0.4$ | $\hat{b}_{2,2,1} = 1.333$ |
| $\hat{b}_{2,1,2} = 0.4$ | $\hat{b}_{2,2,2} = −0.444$ |
| $\hat{b}_{2,1,3} = −0.08$ | $\hat{b}_{2,2,3} = −0.119$ |
| $\hat{b}_{2,1,4} = −0.0133$ | $\hat{b}_{2,2,4} = 0.040$ |

Note that all the coefficient values changed. This new controller now has the dynamics of the second independent variable (a PID set point) removed. This controller can now be used to control the process and the development of this controller was done off line without having to do an additional time consuming expensive identification test on the process.

The same methodology has been derived to remove the PID dynamics from the open loop step response form of the equation. It is shown in U.S. Pat. No. 6,980,938 by the inventor and will not be repeated here.

COLUMN SIMULATION EXAMPLE

An example use of the algorithm is demonstrated in the following example. This example will illustrate the following:

The use of a final control element-based Finite Impulse Response (FIR) model as a process simulator for use as an on-line advisor or off-line training simulator.

Plant step-test and Identification of an FIR model based on a specific regulatory control configuration.

Use of the proposed algorithm to remove the PID controller dynamics and recover the underlying final control element-based model.

In this example, an FIR model based on valve positions is used as the process model to simulate the behavior of a complex fractionator. The regulatory control for the fractionator consists of three PI (proportional/integral) feedback controllers. A plant step test is performed on the simulation using the regulatory controller set points. An FIR model is then obtained for the fractionator based on the set points of the PI controllers. This model based on the regulatory control scheme is then input to the algorithm to remove the PI controller dynamics and recover the original FIR process model.

It should be noted that the term Finite Impulse Response (FIR) model is used to refer to the open-loop step response form of the models, since the step form could be directly calculated from the impulse coefficients.

Description of Complex Fractionator Schematic

The schematic for the Complex Fractionator is shown in FIG. 1. The feed flow rate 5 is controlled by the upstream unit and is pre-heated in a furnace 6. The fractionator 7 has a top, middle and bottom product. The fractionator overhead temperature is controlled with a PI controller 8 moving the top reflux. The middle product draw temperature is controlled with a PI controller 9 moving the middle product draw rate. A third PI controller 10 moves the bottom product rate to control the fractionator bottoms level. The bottom composition (light component) is measured with an analyzer 11.

Description of Finite Impulse Response (FIR) Model

The process model used in this example is an open-loop, step response model based on the valve positions, summarized as follows:

Model Independent Variables

| | |
|---|---|
| TIC-2001.OP | Top Reflux Flow Valve |
| TIC-2002.OP | Middle Product Flow Valve |
| LIC-2007.OP | Bottoms Product Flow Valve |
| FIC-2004.SP | Middle Reflux Flow Rate |
| FI-2005.PV | Fractionator Feed Rate |

Model Dependent Variables

| | |
|---|---|
| TIC-2001.PV | Fractionator Overhead Temperature |
| TIC-2002.PV | Middle Product Draw Temperature |
| LIC-2007.PV | Fractionator Bottoms Level |
| AI-2022.PV | Fractionator Bottoms Composition (Light Component) |

The open-loop step response model can be viewed in an idealized sense as being generated as follows. With the system at steady state, the first independent variables is increased by one engineering unit at time=0 while holding all other independent variables constant. The values for all dependent variables are then measured at equally spaced time intervals until the system reaches steady state again. The model response curves for each dependent variable with respect to the first independent variable are then calculated by subtracting the value of the dependent variable at time=0 from each of the measured values at each future time interval for that dependent variables. Essentially, a step response curve represents the effect on the dependent variable of a change in the independent variable. This process is then repeated successively for all the independent variables to generate the full model. The steady state time for the model is defined by the steady state time of the slowest response curve in the system.

Clearly in the real world, the model cannot be generated in this fashion since often the process is not at steady state. Further, it is impossible to prevent measured and unmeasured disturbances from affecting the system during an independent variable step. Generation of the model requires that multiple steps be made in each independent variable (plant step test). The data thus collected is then analyzed with a software package such as AspenTech's DMCplus Model program to calculate the open-loop step response model.

Once such a model has been identified, it can be used to predict future system response based on past changes in the independent variables. That is to say, if we know how all independent variables have changed for one steady-state time into the past, we can use the model to predict how the dependent variables will change for one steady-state time into the future, assuming no further independent variable changes. This illustrates the use of the model for Prediction. (This is the basis for using an FIR model as a process simulator).

Given the predicted future system response based on no further independent variable changes and given the constraints on all independent and dependent variables, the model can be used to plan a strategy of independent variable moves to keep all independent and dependent variables within constraints. This illustrates the use of the model for Control.

Using a Finite Impulse Response (FIR) Model as a Process Simulator

The model for this example has a steady state time of ninety (90) minutes. A three (3) minute time interval is used. The resulting response curves are each defined by a vector of thirty (30) numbers representing the accumulative change in that dependent variable across time with respect to a step change in the independent variable at time=0 while holding all other independent variables constant.

Figure 2:
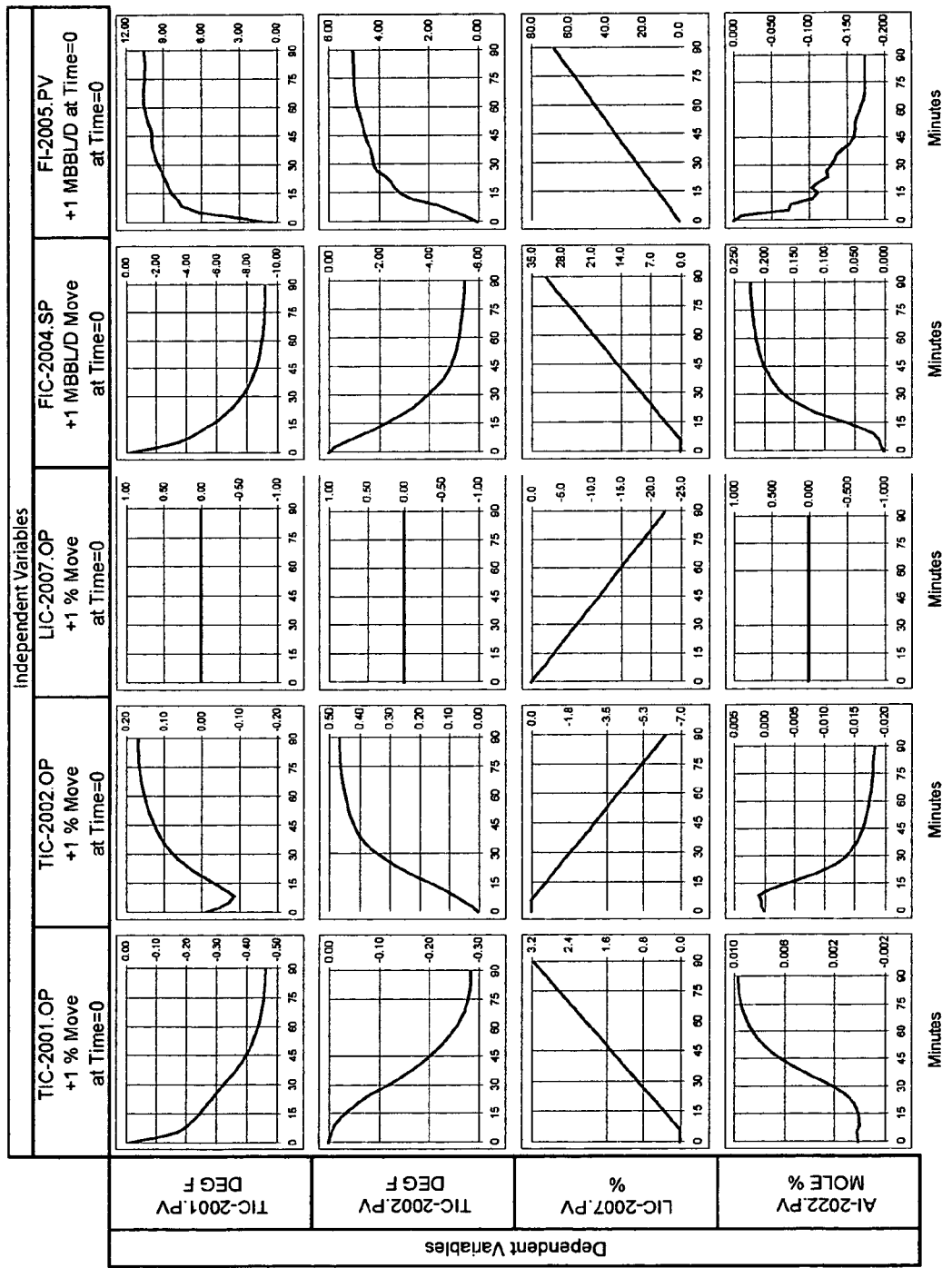
FIG. 2 is a simulation of the fractionator model based on valve positions.

The model coefficients are shown in Table 1 and the model plots are shown in FIG. 2. This model, based on valve positions, is used to predict future system behavior in the model dependent variables based on past and present changes in the model independent variables.

TABLE 1

Fractionator Simulation Valve-based Model Coefficients

| Minutes | TIC-2001.OP +1 % Move at Time = 0 | TIC-2002.OP +1 % Move at Time = 0 | LIC-2007.OP +1 % Move at Time = 0 | FIC-2004.SP +1 MBBL/D Move at Time = 0 | FI-2005.PV +1 MBBL/D Move at Time = 0 |
|---|---|---|---|---|---|
| Step Response Coefficients for Dependent Variable-1: TIC-2001.PV DEG F. | | | | | |
| 0 | 0.000 | 0.000 | 0.0 | 0.00 | 0.0 |
| 3 | −0.101 | −0.048 | 0.0 | −2.05 | 2.9 |
| 6 | −0.175 | −0.076 | 0.0 | −3.58 | 6.1 |
| 9 | −0.206 | −0.088 | 0.0 | −4.43 | 7.5 |
| 12 | −0.227 | −0.068 | 0.0 | −5.03 | 7.8 |
| 15 | −0.245 | −0.040 | 0.0 | −5.58 | 8.2 |
| 18 | −0.262 | −0.015 | 0.0 | −6.16 | 8.5 |
| 21 | −0.277 | 0.010 | 0.0 | −6.65 | 8.6 |
| 24 | −0.292 | 0.033 | 0.0 | −7.04 | 8.9 |
| 27 | −0.306 | 0.054 | 0.0 | −7.37 | 9.0 |
| 30 | −0.323 | 0.069 | 0.0 | −7.67 | 9.3 |
| 33 | −0.340 | 0.084 | 0.0 | −7.95 | 9.5 |
| 36 | −0.356 | 0.096 | 0.0 | −8.18 | 9.6 |
| 39 | −0.372 | 0.105 | 0.0 | −8.37 | 9.8 |
| 42 | −0.386 | 0.113 | 0.0 | −8.52 | 9.8 |
| 45 | −0.399 | 0.121 | 0.0 | −8.65 | 9.8 |
| 48 | −0.410 | 0.128 | 0.0 | −8.75 | 9.9 |
| 51 | −0.420 | 0.135 | 0.0 | −8.84 | 10.0 |
| 54 | −0.428 | 0.140 | 0.0 | −8.92 | 10.1 |
| 57 | −0.435 | 0.145 | 0.0 | −8.98 | 10.3 |
| 60 | −0.440 | 0.149 | 0.0 | −9.04 | 10.4 |
| 63 | −0.445 | 0.153 | 0.0 | −9.09 | 10.5 |
| 66 | −0.450 | 0.156 | 0.0 | −9.13 | 10.5 |
| 69 | −0.453 | 0.159 | 0.0 | −9.17 | 10.5 |
| 72 | −0.457 | 0.161 | 0.0 | −9.21 | 10.5 |
| 75 | −0.460 | 0.163 | 0.0 | −9.24 | 10.4 |
| 78 | −0.462 | 0.165 | 0.0 | −9.26 | 10.4 |
| 81 | −0.464 | 0.166 | 0.0 | −9.28 | 10.4 |
| 84 | −0.465 | 0.167 | 0.0 | −9.29 | 10.4 |
| 87 | −0.466 | 0.167 | 0.0 | −9.29 | 10.4 |
| 90 | −0.466 | 0.167 | 0.0 | −9.29 | 10.5 |
| Step Response Coefficients for Dependent Variable-2: TIC-2002.PV DEG F. | | | | | |
| 0 | 0.000 | 0.000 | 0.0 | 0.00 | 0.00 |
| 3 | −0.002 | 0.020 | 0.0 | −0.28 | 0.46 |
| 6 | −0.008 | 0.052 | 0.0 | −0.73 | 1.06 |
| 9 | −0.012 | 0.081 | 0.0 | −1.26 | 1.62 |
| 12 | −0.021 | 0.118 | 0.0 | −1.77 | 2.63 |
| 15 | −0.032 | 0.157 | 0.0 | −2.23 | 3.12 |
| 18 | −0.046 | 0.201 | 0.0 | −2.64 | 3.34 |
| 21 | −0.061 | 0.242 | 0.0 | −3.06 | 3.50 |
| 24 | −0.077 | 0.277 | 0.0 | −3.40 | 3.69 |
| 27 | −0.097 | 0.308 | 0.0 | −3.67 | 4.05 |
| 30 | −0.117 | 0.335 | 0.0 | −3.93 | 4.18 |
| 33 | −0.136 | 0.360 | 0.0 | −4.19 | 4.22 |
| 36 | −0.153 | 0.380 | 0.0 | −4.42 | 4.26 |
| 39 | −0.170 | 0.396 | 0.0 | −4.62 | 4.33 |
| 42 | −0.186 | 0.407 | 0.0 | −4.78 | 4.46 |
| 45 | −0.201 | 0.416 | 0.0 | −4.90 | 4.55 |
| 48 | −0.214 | 0.423 | 0.0 | −4.99 | 4.61 |
| 51 | −0.225 | 0.430 | 0.0 | −5.07 | 4.64 |
| 54 | −0.236 | 0.436 | 0.0 | −5.13 | 4.70 |
| 57 | −0.245 | 0.440 | 0.0 | −5.19 | 4.77 |
| 60 | −0.253 | 0.445 | 0.0 | −5.23 | 4.85 |
| 63 | −0.260 | 0.449 | 0.0 | −5.27 | 4.90 |
| 66 | −0.266 | 0.452 | 0.0 | −5.30 | 4.94 |
| 69 | −0.272 | 0.455 | 0.0 | −5.33 | 4.96 |
| 72 | −0.276 | 0.458 | 0.0 | −5.36 | 4.98 |
| 75 | −0.279 | 0.460 | 0.0 | −5.38 | 4.98 |
| 78 | −0.282 | 0.462 | 0.0 | −5.40 | 4.99 |
| 81 | −0.284 | 0.463 | 0.0 | −5.42 | 5.00 |
| 84 | −0.285 | 0.464 | 0.0 | −5.44 | 5.01 |
| 87 | −0.285 | 0.465 | 0.0 | −5.45 | 5.02 |
| 90 | −0.285 | 0.465 | 0.0 | −5.46 | 5.04 |

TABLE 1-continued

Fractionator Simulation Valve-based Model Coefficients

| Minutes | TIC-2001.OP +1 % Move at Time = 0 | TIC-2002.OP +1 % Move at Time = 0 | LIC-2007.OP +1 % Move at Time = 0 | FIC-2004.SP +1 MBBL/D Move at Time = 0 | FI-2005.PV +1 MBBL/D Move at Time = 0 |
|---|---|---|---|---|---|
| Step Response Coefficients for Dependent Variable-3: LIC-2001.PV % ||||||
| 0 | 0.00 | 0.00 | 0.0 | 0.0 | 0.0 |
| 3 | 0.00 | 0.00 | −0.8 | 0.0 | 2.3 |
| 6 | 0.00 | 0.00 | −1.5 | 0.0 | 4.5 |
| 9 | 0.11 | −0.23 | −2.3 | 1.1 | 6.8 |
| 12 | 0.23 | −0.45 | −3.0 | 2.3 | 9.0 |
| 15 | 0.34 | −0.68 | −3.8 | 3.4 | 11.3 |
| 18 | 0.45 | −0.90 | −4.5 | 4.5 | 13.5 |
| 21 | 0.56 | −1.13 | −5.3 | 5.6 | 15.8 |
| 24 | 0.68 | −1.35 | −6.0 | 6.8 | 18.0 |
| 27 | 0.79 | −1.58 | −6.8 | 7.9 | 20.3 |
| 30 | 0.90 | −1.80 | −7.5 | 9.0 | 22.5 |
| 33 | 1.01 | −2.03 | −8.3 | 10.1 | 24.8 |
| 36 | 1.13 | −2.25 | −9.0 | 11.3 | 27.0 |
| 39 | 1.24 | −2.48 | −9.8 | 12.4 | 29.3 |
| 42 | 1.35 | −2.70 | −10.5 | 13.5 | 31.5 |
| 45 | 1.46 | −2.93 | −11.3 | 14.6 | 33.8 |
| 48 | 1.58 | −3.15 | −12.0 | 15.8 | 36.0 |
| 51 | 1.69 | −3.38 | −12.8 | 16.9 | 38.3 |
| 54 | 1.80 | −3.60 | −13.5 | 18.0 | 40.5 |
| 57 | 1.91 | −3.83 | −14.3 | 19.1 | 42.8 |
| 60 | 2.03 | −4.05 | −15.0 | 20.3 | 45.0 |
| 63 | 2.14 | −4.28 | −15.8 | 21.4 | 47.3 |
| 66 | 2.25 | −4.50 | −16.5 | 22.5 | 49.5 |
| 69 | 2.36 | −4.73 | −17.3 | 23.6 | 51.8 |
| 72 | 2.48 | −4.95 | −18.0 | 24.8 | 54.0 |
| 75 | 2.59 | −5.18 | −18.8 | 25.9 | 56.3 |
| 78 | 2.70 | −5.40 | −19.5 | 27.0 | 58.5 |
| 81 | 2.81 | −5.63 | −20.3 | 28.1 | 60.8 |
| 84 | 2.93 | −5.85 | −21.0 | 29.3 | 63.0 |
| 87 | 3.04 | −6.08 | −21.8 | 30.4 | 65.3 |
| 90 | 3.15 | −6.30 | −22.5 | 31.5 | 67.5 |
| Step Response Coefficients for Dependent Variable-4: AI-2022.PV MOLE % ||||||
| 0 | 0.00000 | 0.0000 | 0.0 | 0.000 | 0.000 |
| 3 | 0.00004 | 0.0004 | 0.0 | 0.004 | −0.010 |
| 6 | 0.00010 | 0.0005 | 0.0 | 0.008 | −0.073 |
| 9 | −0.00014 | 0.0008 | 0.0 | 0.017 | −0.076 |
| 12 | −0.00006 | −0.0007 | 0.0 | 0.037 | −0.105 |
| 15 | −0.00003 | −0.0034 | 0.0 | 0.060 | −0.112 |
| 18 | 0.00013 | −0.0062 | 0.0 | 0.090 | −0.104 |
| 21 | 0.00033 | −0.0087 | 0.0 | 0.114 | −0.113 |
| 24 | 0.00075 | −0.0109 | 0.0 | 0.134 | −0.126 |
| 27 | 0.00125 | −0.0125 | 0.0 | 0.152 | −0.124 |
| 30 | 0.00193 | −0.0137 | 0.0 | 0.165 | −0.130 |
| 33 | 0.00277 | −0.0145 | 0.0 | 0.175 | −0.134 |
| 36 | 0.00368 | −0.0151 | 0.0 | 0.183 | −0.137 |
| 39 | 0.00459 | −0.0157 | 0.0 | 0.189 | −0.144 |
| 42 | 0.00542 | −0.0161 | 0.0 | 0.194 | −0.154 |
| 45 | 0.00615 | −0.0164 | 0.0 | 0.199 | −0.161 |
| 48 | 0.00679 | −0.0167 | 0.0 | 0.203 | −0.162 |
| 51 | 0.00733 | −0.0170 | 0.0 | 0.206 | −0.162 |
| 54 | 0.00778 | −0.0172 | 0.0 | 0.208 | −0.163 |
| 57 | 0.00815 | −0.0174 | 0.0 | 0.211 | −0.165 |
| 60 | 0.00846 | −0.0175 | 0.0 | 0.213 | −0.168 |
| 63 | 0.00872 | −0.0177 | 0.0 | 0.214 | −0.171 |
| 66 | 0.00893 | −0.0178 | 0.0 | 0.216 | −0.173 |
| 69 | 0.00911 | −0.0179 | 0.0 | 0.217 | −0.175 |
| 72 | 0.00926 | −0.0180 | 0.0 | 0.218 | −0.176 |
| 75 | 0.00938 | −0.0181 | 0.0 | 0.219 | −0.176 |
| 78 | 0.00948 | −0.0182 | 0.0 | 0.220 | −0.175 |
| 81 | 0.00956 | −0.0182 | 0.0 | 0.221 | −0.175 |
| 84 | 0.00962 | −0.0183 | 0.0 | 0.222 | −0.175 |
| 87 | 0.00966 | −0.0184 | 0.0 | 0.222 | −0.175 |
| 90 | 0.00967 | −0.0185 | 0.0 | 0.223 | −0.175 |

As mentioned above, there are three PI (Proportional/Integral) controllers in the system. These PI controllers are configured as follows:

TABLE 2

Fractionator PID Controllers

| PID Loop Name | Set Point | Process Variable | Output | $K_p$ | $K_i$ |
|---|---|---|---|---|---|
| Top Temperature | TIC-2001.SP | TIC-2001.PV | TIC-2001.OP | −2.0 | 3.0 |
| Middle Product Draw Temperature | TIC-2002.SP | TIC-2002.PV | TIC-2002.OP | 3.0 | 8.0 |
| Bottoms Level | LIC-2001.SP | LIC-2001.PV | LIC-2007.OP | −1.0 | 4.0 |

Figure 3:
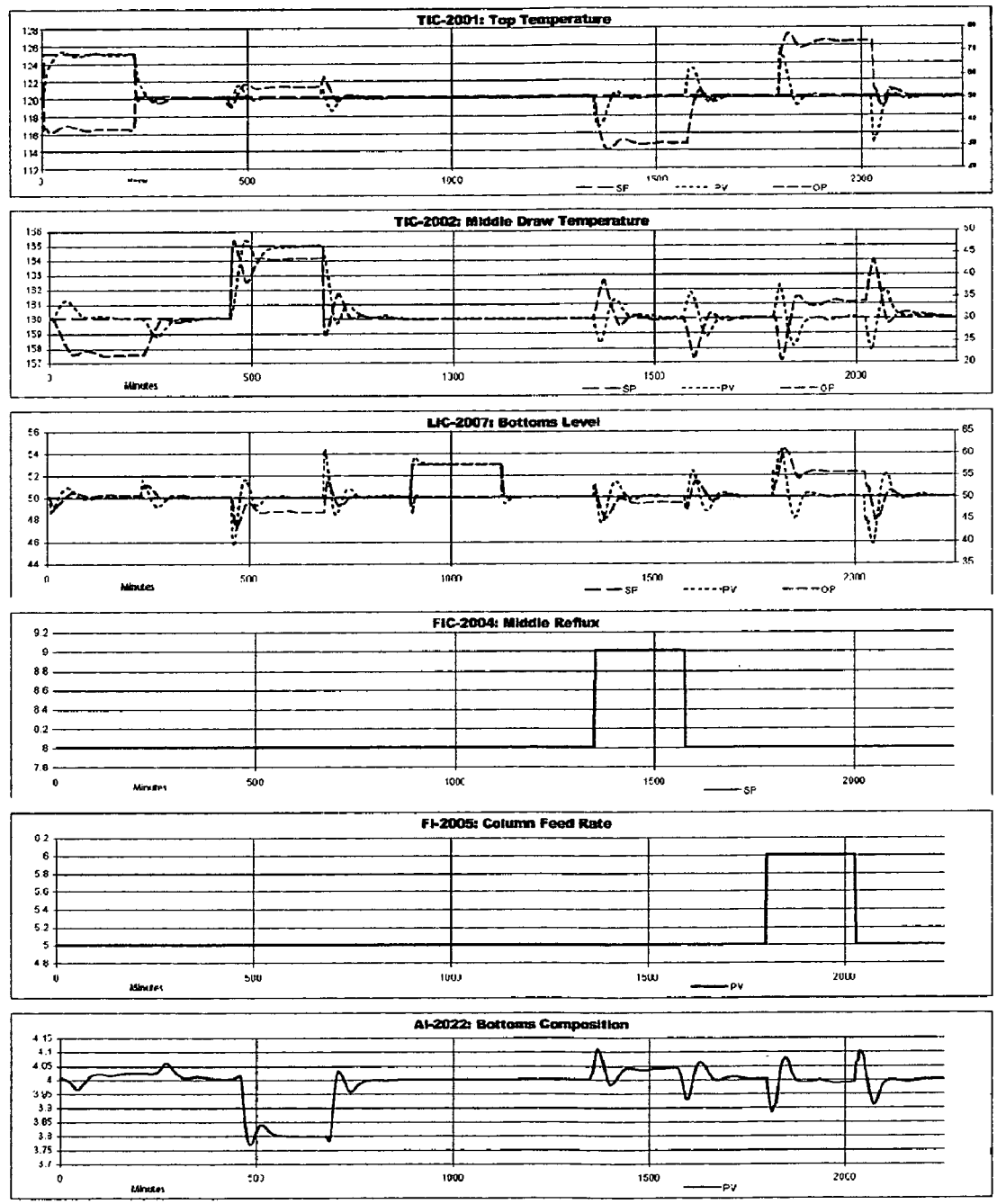
FIG. 3 demonstrates the results from a plant test of the fractionator.

A plant test was performed (data plots in FIG. 3) with these PI controllers regulating the process. The independent and dependent variables for the system were as follows:

Model Independent Variables

| TIC-2001.SP | Top Reflux Flow Valve SP |
| TIC-2002.SP | Middle Product Flow Valve SP |
| LIC-2007.SP | Bottoms Product Flow Valve SP |
| FIC-2004.SP | Middle Reflux Flow Rate |
| FI-2005.PV | Fractionator Feed Rate |

Model Dependent Variables

| TIC-2001.PV | Fractionator Overhead Temperature |
| TIC-2002.PV | Middle Product Draw Temperature |
| LIC-2007.PV | Fractionator Bottoms Level |
| TIC-2001.OP | Top Reflux Flow Valve |
| TIC-2002.OP | Middle Product Flow Valve |
| LIC-2007.OP | Bottoms Product Flow Valve |
| AI-2022.PV | Fractionator Bottoms Composition (Light Component) |

This illustrates the use of a final control element-based FIR model as a process simulator. As described above, the PID control calculations were performed external to the process simulation.

Figure 4:
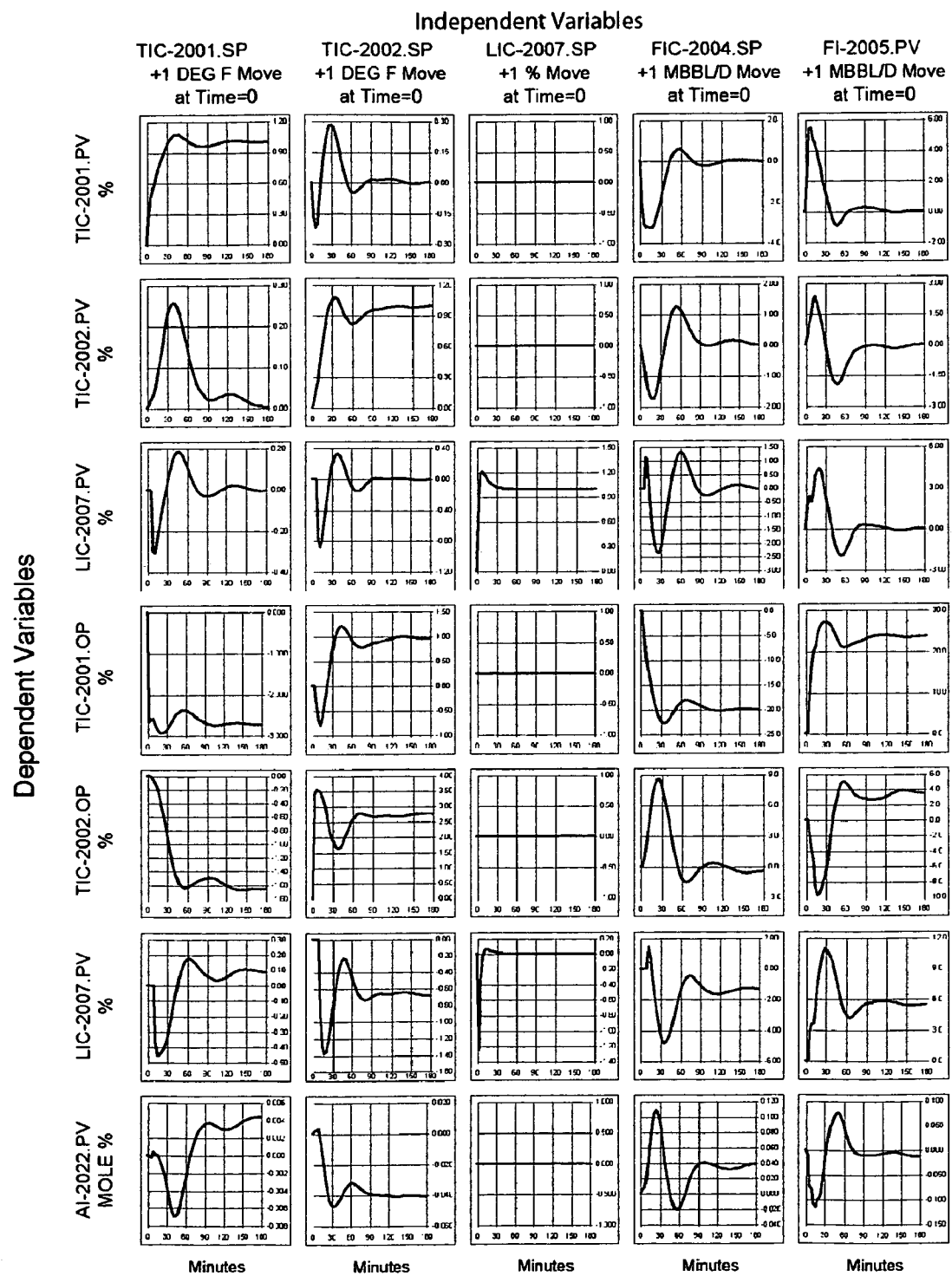
FIG. 4 is a simulation of the fractionator with the PID controllers.

The resulting data were analyzed and a model based on this PID configuration was identified, as shown in FIG. 4.

Figure 5:
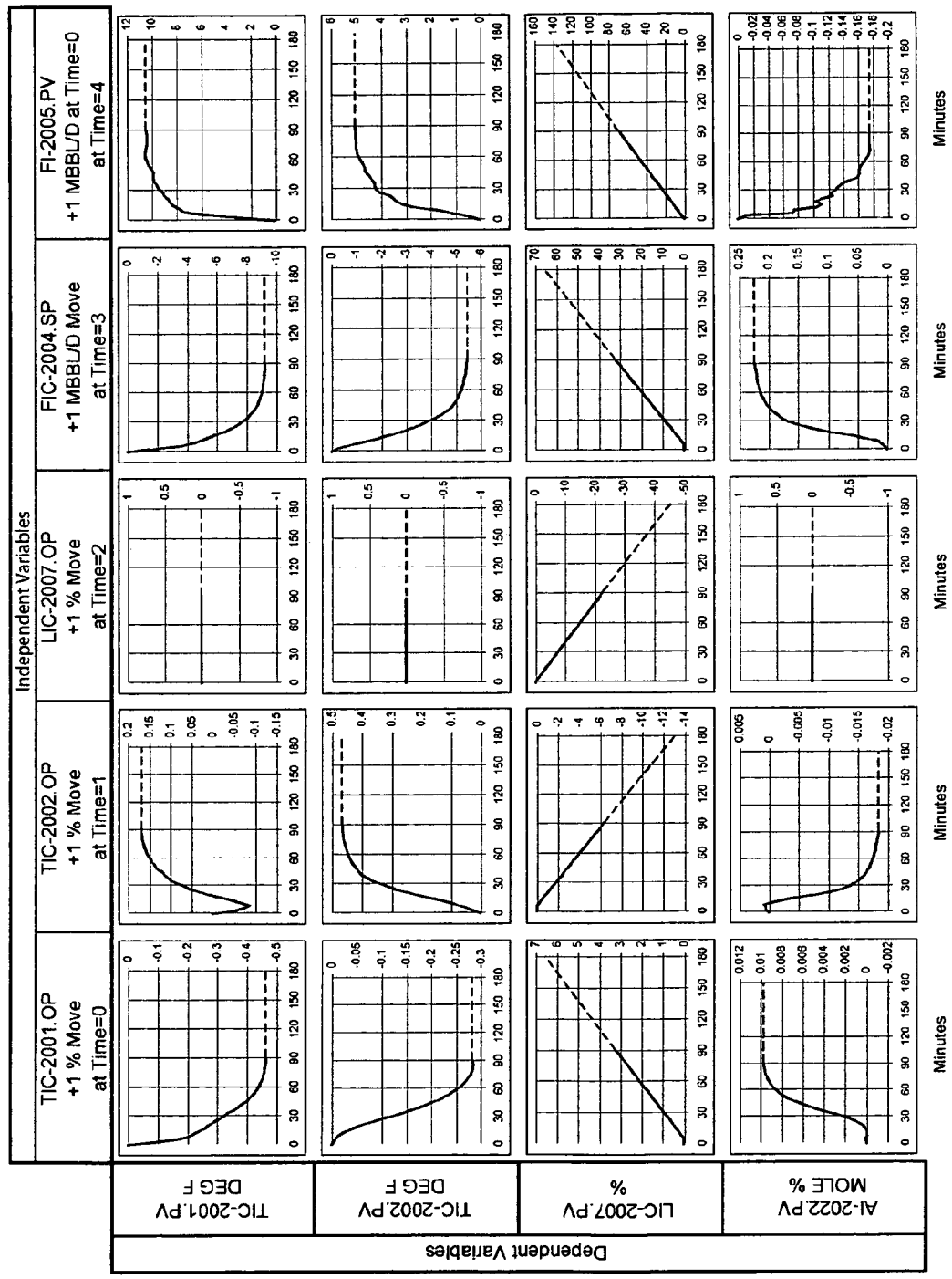
FIG. 5 is a demonstration of the fractionator with the original and recovered values

The new algorithm to remove PID dynamics was applied to the model shown in FIG. 4, and this model with the PID dynamics removed is compared to the original simulation model. As can be seen in FIG. 5, the algorithm successfully recovers the original final control element based model. Note that the steady state time of the recovered model is longer than the steady state time of the original model. This is a result of a longer steady state time for the model with the PID controllers. The original final control element-based simulation model had a steady state time of 90 minutes.

When the PID controllers were configured and the plant step-test performed, it took 180 minutes for the process to reach steady state, due to having to wait for the PID feedback control to settle out. The steady state time of the recovered final control element-based model has the same steady state time as the model containing the PID dynamics from which it was generated. It can be seen, however, that the recovered model has reached steady state in 90 minutes, and if it were truncated at that point, would exactly match the original final control element-based model.

Adaptive Multivariable Controller (AMC)

The ability to create a multivariable controller with a fast open loop model that replaces the PID controllers and their set points with their final control elements enables the further development of an adaptive multivariable controller as now described. Both of these elements, the speed of the model, and the elimination of PID set points as independent variables, are crucial to enabling the development of an AMC.

The speed of the FIR open model allows the frequency of the control of the multivariable controller to be sufficient to handle disturbances to the process, which are normally handled by the PID controllers. When the multivariable controller is turned on, the PID controllers are placed in manual and the multivariable controller moves the valves.

Figure 6:
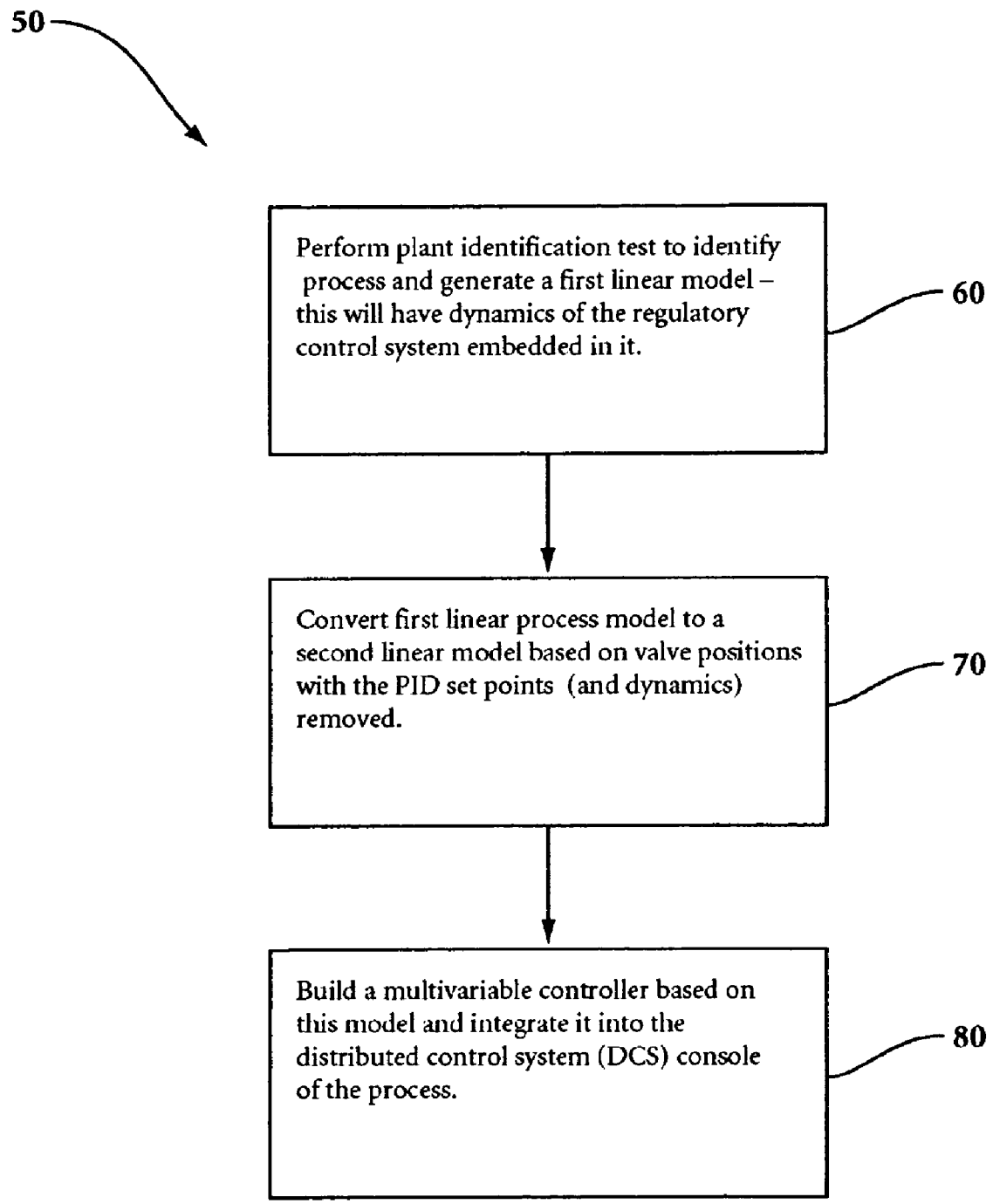
FIG. 6 is a flow sheet representation of the steps of an aspect of the inventive method.

The critical factor in the development an AMC is the integration of components in a specific way to create the necessary synergism. The integrated inventive concept can be seen schematically in FIG. 6, shown generally by the numeral 50. A plant identification test can be performed (step 60) with any stable regulatory configuration and PID tuning and a corresponding model can be obtained. During this test the individual positions of the final control elements (such as valve positions) are measured as variables. During this process the highly non-linear response of the final control elements are effectively linearized by using approaches such as piecewise-linear transforms (described later). The algorithm to remove the PID dynamics is then applied (step 70) to the resulting model to remove the dynamics of all PID controllers and convert the model inputs from PID set points to valves or final control elements. This is now an open loop FIR model in which the final control element positions are independent variables. The third step is then to use this model to build a multivariable controller based on this model and integrate it into the distributed control system (DCS) console of the process. These first three steps represent the initialization phase of the adaptive multivariable controller. At this point there is still no adaptive control.

Figure 7:
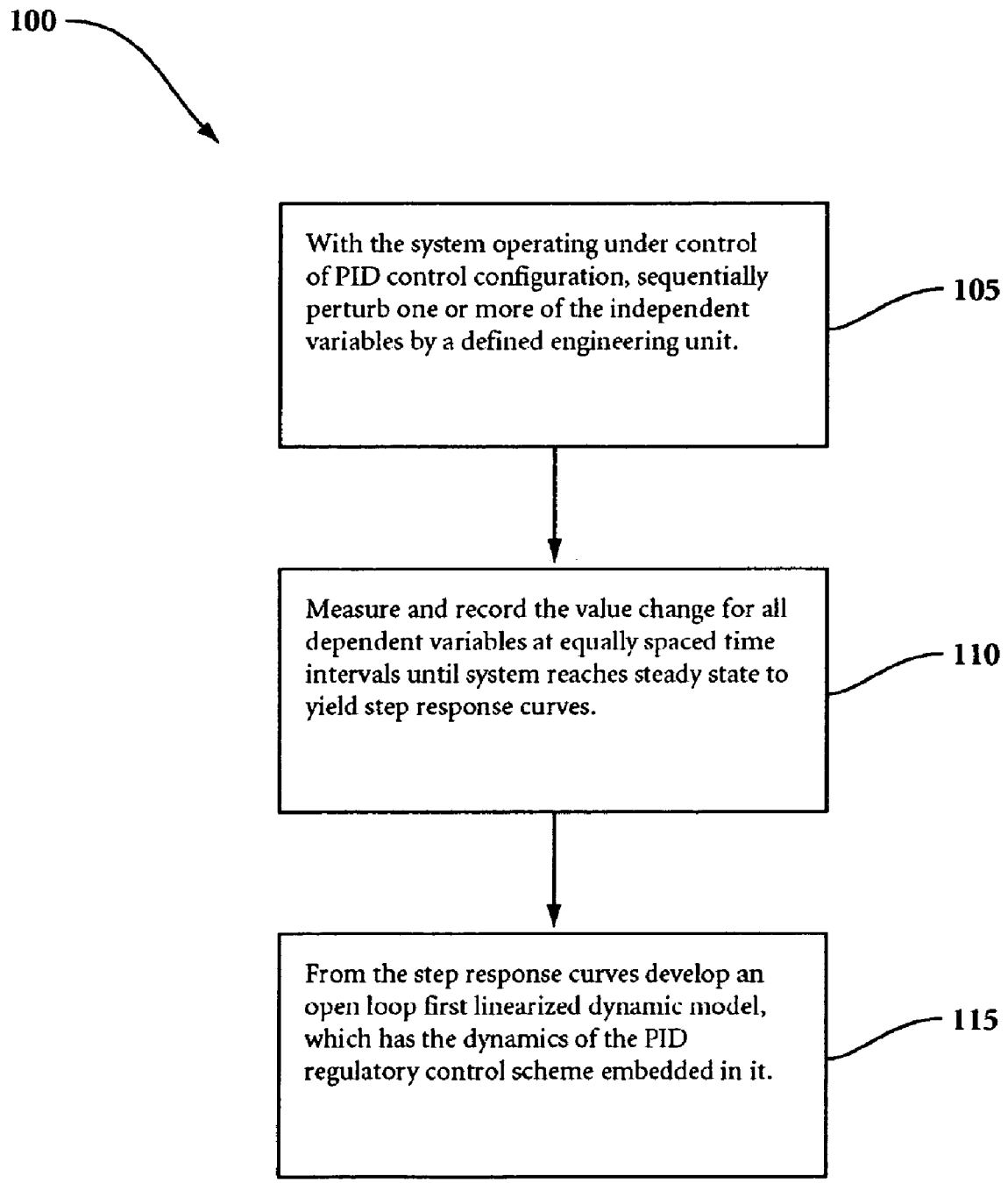
FIG. 7 is a flow sheet representation of the steps of an aspect of the inventive method.

The plant identification of step 60 of FIG. 6 is shown in more detail in FIG. 7 in the steps shown generally as numeral 100. In step 105 each independent variable is perturbed. Although perturbing one variable at a time could do this, in practice several variables are perturbed at a time. In addition, to avoid correlation of variables, different combinations of variables are perturbed each time. In step 110, as the independent variables are changed the values of the dependent variables are measured and recorded at equally spaced time intervals. From the step response curves the coefficients of an open loop linearized dynamic matrix are obtained (step 115) in a straightforward manner. As previously mentioned this can take the form of a step response model (SRM) or by taking numerical derivatives of each curve will yield the coefficients of a finite impulse response (FIR) model. The invention anticipates that either of these forms can be used.

One fundamental problem that is addressed during this identification step is that the final control elements, particularly control valves, are very nonlinear. Transforming the nonlinear relationship into a linear relationship, which can be properly modeled facilitates the creation of the open loop model by maintaining the linearity of the FIR model being inverted using matrix row elimination. Control valves may be characterized according to their inherent flow characteristics, which describe the flow rate through the valve as a function of the valve stem position with a constant pressure drop across the valve. These characteristics are described as decreasing, constant or increasing sensitivity. When control valves are combined with other equipment (pipes, orifice plates, bends etc), the installed flow-rate characteristics differ from the inherent characteristics of any single element in the system. The effects of resistances resulting from piping, orifice plates, or other equipment in series with the control valve and the variation of available head with flow rate affect the flow vs. stem relationship. Installed control valve characteristics can be approximated by linear or parabolic curves or quite commonly a simpler approach is to use a piece-wise-linear (PWL) transform, since it is easier to prescribe exactly the desired transformation shape—the linear and parabolic approximations will often not fit all of the desired operating range. Commercial identification software available to practitioners contains many standard transformations, including the linear and parabolic valve transforms as well as the PWL transform so that process data can be linearized prior to identifying FIR models.

Figure 8:
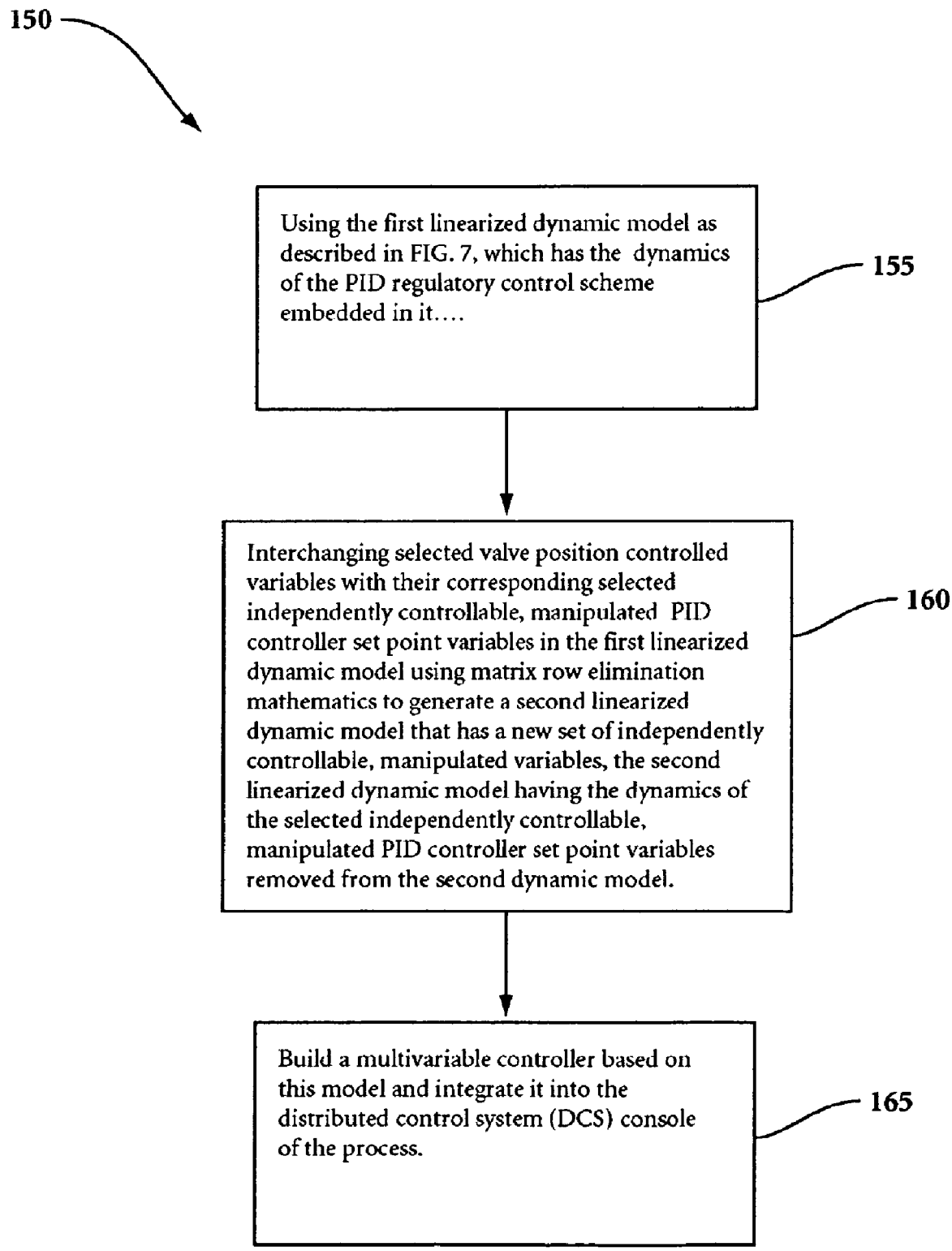
FIG. 8 is a flow sheet representation of the steps of an aspect of the inventive method.

The details of step 70 of FIG. 6 are now shown in FIG. 8 in the steps shown generally as the numeral 150. Beginning with the linearized model developed in step 115 of FIG. 7, step 160 describes the mathematical algorithm which interchanges selected final control element position controlled variables with their corresponding selected independently controllable, manipulated PID controller set point variables in the first linearized dynamic model using matrix row elimination mathematics to generate a second linearized dynamic model that has a new set of independently controllable, manipulated variables, the second linearized dynamic model having the dynamics of the selected independently controllable, manipulated PID controller set point variables removed from the second dynamic model. That second linearized model can now be used to build a multivariable controller based on this model and integrate it into the distributed control system (DCS) console of the process. This model is an all transformation valve model.

Figure 9:
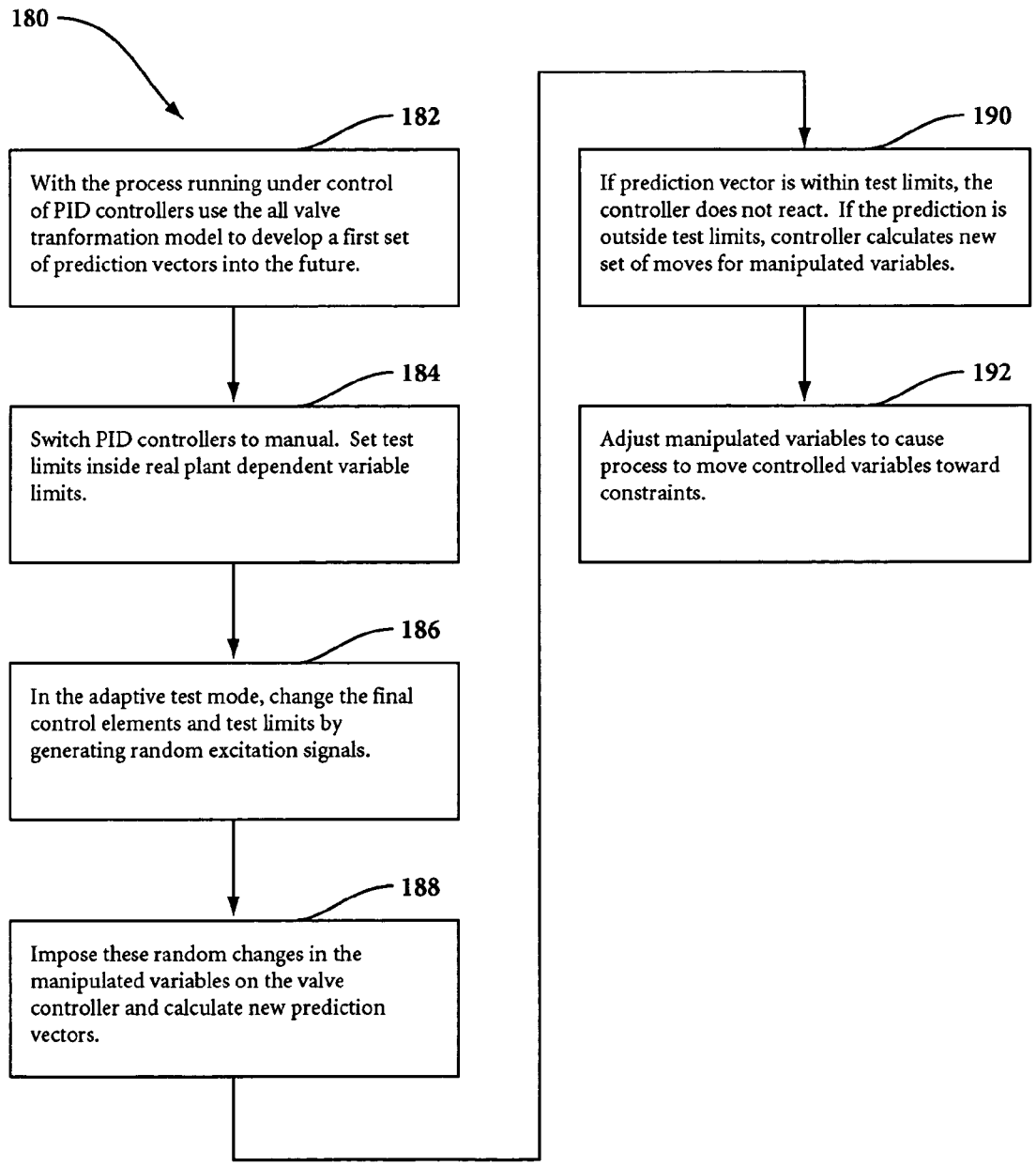
FIG. 9 is a flow sheet representation of the steps of an aspect of the inventive method.

The adaptation phase is shown beginning in FIG. 9, shown generally as the numeral 180. In step 182 with the process running under control of the PID controllers the all transformation valve model developed as described above is used to develop prediction vectors into the future. The adaptation step 184 then begins by placing the controller in an adaptive test mode wherein all of the PID controllers are switched to manual. In the adaptive test mode the manipulated variable final control elements and controlled variable test limits are changed 186 by generating random excitation signals that perturb those variables. Note that these manipulated variables are primarily the final control element positions. Further, the controlled variable test limits are changed randomly. For this adaptive test the test limits are inside the real plant controlled variable limits and are only considered while testing. The random changes in the manipulated variables and controlled variable test limits are imposed on the multivariable controller in step 188. The controller calculation is then made with the test limits adjusted for their random movement. When the prediction vector for each of the controlled variables is inside the test limits, step 190, the weighting factors for the equations representing the prediction vector is set to zero such that the controller considers the breadth of the test limits as the set points for the controller. When the prediction is outside the test limits the weight normally supplied for the region will be applied. Then the manipulated variables are adjusted, step 192, to cause the process to move the controlled variables toward their pre-defined constraints. In effect the controller will only react when the predicted value of a controlled variable is outside the test limits. As the adaptation continues new data is gathered from the process regarding the final control elements (for example new data on control valve positions versus flow rates). This data can be used to periodically update the piece wise linear transformations on each of the final control elements so that they represent the actual behavior of the process. All of this is possible because the open loop FIR model described earlier is very fast and is completely capable of staying ahead of the process dynamics.

Figure 10:
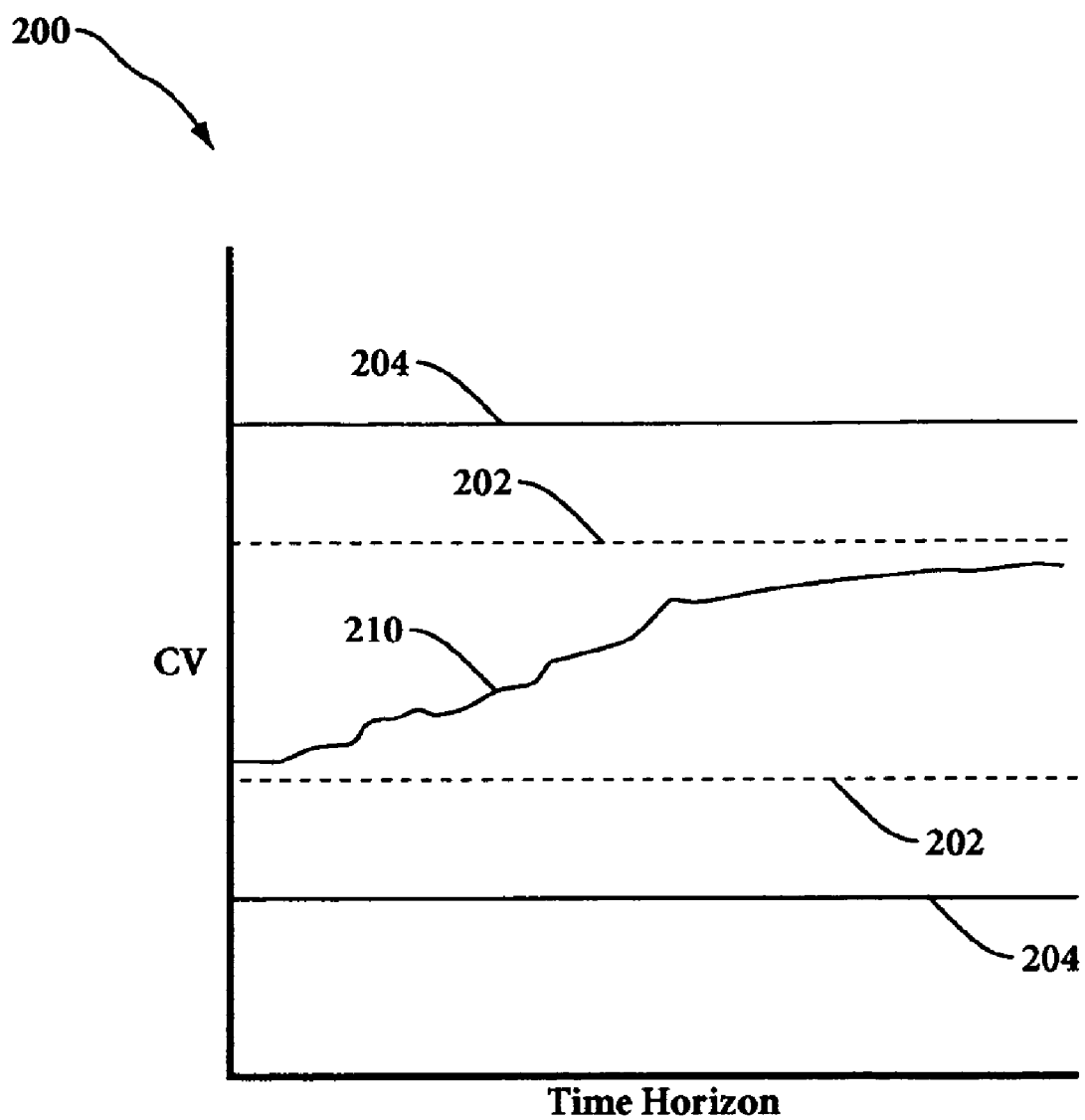
FIG. 10 is a depiction of the adaptive test limits for a controlled variable.

FIG. 10, depicted generally as numeral 200 shows pictorially the concept of the adaptive test limits 202 set between the outer upper and lower limits 204 of a particular controlled variable (CV). The outer upper and lower limits 204 may also represent constraints for the controlled variable. The adaptive test limits 202 may also be perturbed as part of the adaptive strategy.

As an alternative method it may sometimes be desired to randomly excite not the final control elements but the variables they effect. For example it may be desired to excite the flow rate through a control valve as the manipulated variable instead of the control valve itself. Because the mathematical relation between many process variables (PV's), such as for example flow rates, and the valve position is known from the piece wise linear transformations described earlier this can also be done and is another aspect of the instant invention. In effect, being able to do the transformations onto a process variable basis means the independent variable in the model is now the process variable associated with a valve rather than the valve itself. This is highly desirable since most process systems over the normal operating ranges behave linearly with flow. The transform back after the controller calculations are made changes the flow moves to valve moves. Thus the independent variables for the predictions are really in the context of PV flow changes rather than valve changes. Recognizing this point simplifies the prediction calculations by using the change in the process variable directly. Further, when a valve sticks it does not corrupt the prediction vectors by putting in change that has not occurred. This is a significant factor when comparing the traditional multivariable controller with the adaptive controller of the instant invention, since the set point change by the traditional controller is used to update the prediction and the PID controller will windup until the flow changes. This may happen in 5 seconds or 5 minutes depending on the PID tuning parameters. When the PID controller gets the valve to move, it creates an unmeasured disturbance for the process that has to be worked out basis feed back on other CVs. In effect the sticking valve creates significant problems with the prediction of the CVs. The PV model of the adaptive controller of the instant invention does not solve the sticking valve problem, but it does not amplify it and the sticking does not corrupt the prediction vectors.

As discussed earlier in describing the transformation of the model to remove the dynamics of the PID controller and replace each PID element with a final control element, the final control element in many processes is a valve but it can be other things such as the speed setting on a motor or a flow rate. The term final control element anticipates any of those elements that are responsive to a PID control loop. We wish to re-constitute the model so that the final control element is the independent variable in the process model; that is to say, we wish to remove the dynamics of this PID controller from all affected model responses.

As a further elaboration the identification software described here can be used to create a process variable model directly rather than a controller output (OP) model. If we mathematically pivot on the process variable rather than the controller output, the process variable model can be obtained directly from the closed model data. The advantage is that it is known that the process variable for a unit change setpoint change needs to come to one and the off diagonal elements for the process variable must come to zero. This expedites the selection of the closed model for inversion to an open model. When the adaptive identification is done, the process variable can be used as the independent variable for 90 percent of the variables. If a process variable is not available, the controller output of the valve is used. An example: The independent process variable for a furnace could be fuel flow, which is in a cascaded arrangement in the PID configuration with a temperature resetting the setpoint on a pressure controller which moves the control valve that regulates the fuel flow. The actual flow measurement is not in the PID cascade. The manipulated output to the valve is accomplished with the pressure controller on the fuel in manual. The transform is between the pressure controller output and the fuel flow. Another example: The independent variable for a column pressure controller is the vapor flow off an accumulator. The pressure controller output would be in manual and its output setting the control valve. The transform would be between the pressure controller output and vapor flow off the accumulator. Another example: The independent variable on the suction of a compressor could be the speed of the compressor. The pressure controller on the suction pressure would be in manual, which set the mechanical speed controller set point directly. The transformation would be between the pressure controller output and the compressor speed.

With the multivariable controller running with the all transformation valve model, the major impediments to successful implementation of Multivariable Adaptive Control are eliminated.

The first impediment eliminated is the high noise inherent in traditional MPC controllers. The removal of the PID controllers as sub controllers from the multivariable controller results in a significant reduction in the measurement noise created by the interaction of the PID controllers. Reducing the noise increases the signal to noise ratio, which is a key parameter in obtaining a good model.

The second impediment eliminated with the inventive concept is the high correlation of data that normally exists between the behavior of the multivariable controller with its existing dynamic model and the excitation signals. To ensure this impediment removed the adaptive part of the AMC must move the set points and limits on the adaptive multivariable controller randomly. With the traditional closed multivariable controller, the elimination of correlation by randomly moving the set points and limits results in many of the outputs of the PID controllers being at their upper or lower limits a high percentage of the time. When a PID controller's output signal reaches a limit such as the valve being all the way open or closed, the effect on the dynamic model of the plant is the same as switching the controller to manual. The change in the PID controller configuration causes a discontinuity in the mathematics for identifying the dynamic model. The result of the change in configuration is the data is lost for the time the valve is open or closed plus the time to steady state for the process after the PID controller's valve returns to it normal range of operation. But with all the adaptive multivariable controller's valves in manual, the loss of data from valves saturating does not occur.

The third impediment removed with this inventive concept is the frequent invalidation of the model that often occurs with traditional multivariable controllers. With the traditional closed (set points as manipulated variables) multivariable controller, the saturation of valves during the testing mode of the AMC not only creates problems for the identification mathematics, but also creates problems for the multivariable controller by invalidating its model. The open model in an AMC will never be invalidated by the saturation of valves because as mentioned, the valves are in manual mode and by design never saturate.

The fourth impediment eliminated by the inventive concept is due to the relative ease of updating the valve transformations because the valves are independent variables. The updating of the valve transformations is as critical as updating the step response models. Updating the valve transformations using a piece-wise-linear method is much simpler and less prone to error when the valves are the independent variables. The PID controller's action in responding to its interaction with other PID controllers makes the both the controller's process variable (PV) and controller's output (OP) uncertain or noisy. The basis of the non-linear transformation is the correlation between the process variables and controller outputs, which leads to poorer transformations when the PID controllers are active.

It is important to emphasize the importance of now having an open loop process model that is final control element based. A traditional model predicative controller uses measurements from the process to update the prediction of the future state of the process but in cases where valves are saturating the prediction is invalidated and that data has to be ignored. With an open loop model that is based on final control elements instead of PID set points the prediction is maintained at all times regardless of what is happening to the PID controllers in the background. Thus the adaptive model described here can be used for the creation of prediction vectors for predictive multivariable controllers without concern for valve saturation or changes in the regulatory control configuration or tuning. This capability has not been previously available.

With the fast adaptive model just described available two further embodiments are now possible. Firstly, the adaptive multivariable controller model can be coupled to an emulation of the PID control scheme and ported to any computer and be used as an off-line simulator for operator training or engineering evaluation. Such mathematical emulators of regulatory control are readily available in commercial process control packages. Secondly, the adaptive model can be coupled to an emulation of the PID control scheme and coupled through a distributed control system (DCS) console to create a fast and authentic on-line operator advisor to guide operators during operation of the process. The model can be initialized with historical data or with real time data from the process. When the operator is in the background mode using historical data he can execute scenarios that have previously been designed or create new ones. In the real time background mode the operator can choose the "what if" option and have the simulation initialize the current state of the dependent and independent variables, the configuration and tuning of the PID controllers, and the updated state of the open loop prediction vectors of where the process will go based on all the relevant data from the past. It is important to note also that as the operator executes a "what-if" scenario and the results are not satisfactory the operator can halt the execution, modify the scenario, and re-start the advisor multiple times until a desired result is achieved. Each time that is done the operator advisor can also re-access the real time data from the process to initialize the dependent and independent variables, re-initialize the control configuration, re-set the state of the final control element prediction vectors, and then resolve the model. This can be done until a satisfactory change is found.

The high speed of the operator advisor model based on the adaptive controller makes this aspect of the invention possible.

Finally, it should be noted that a fully implemented multivariable controller is integrated with a linear program for optimizing the process. The linear program is constantly being optimized using an algorithm such as the Simplex algorithm. It is possible that as the Simplex algorithm is running it will not converge to a feasible solution. When this happens the linear program will begin to input radical changes to the process. These radical changes are input to the controller as set points, which can cause significant disruption to the process. It has been discovered that the same techniques used for minimizing the movement of the manipulated variables as used in the on-line identification just described can be used to prevent the radical changes to the linear programs solution. The test limits specified for the identification can be changed to the operator limits on the process. The controller will see the same infeasibility as the linear program, since both have the same steady state solution based on the prediction of the steady state. The controller will use the operator limits as set points when the prediction of the dependent variables are outside their limits and not from the infeasible linear program. The error given to the controller to eliminate will be the based on those dependent variables that are outside of their operating limits. There will be no error attributed to dependent variable predictions that are within their operating limits. In effect the areas between the limits can be viewed as wide set points.

The foregoing is accomplished by dropping out all the rows in the original control matrix where the prediction is within the limits. The control matrix is the matrix described earlier in which the PID controllers and their set points have been replaced by their associated final control elements, which might be valves, or for example, a speed setting on a motor. The rows where the error exists will be multiplied by the relative importance factor for the dependent variables associated with these rows. The result of the controller's calculation will be to distribute the infeasibility over the dependent variables that are at their limits or in close vicinity of the limits. The amount of the infeasibility will be proportional to the relative importance specified for the dependent variable. It has been found that the result of adding this feature to the controller is a minimization of the disruption to the process while the operator decides which constraints to relax to return the linear program to a feasible state.

Figure 11:
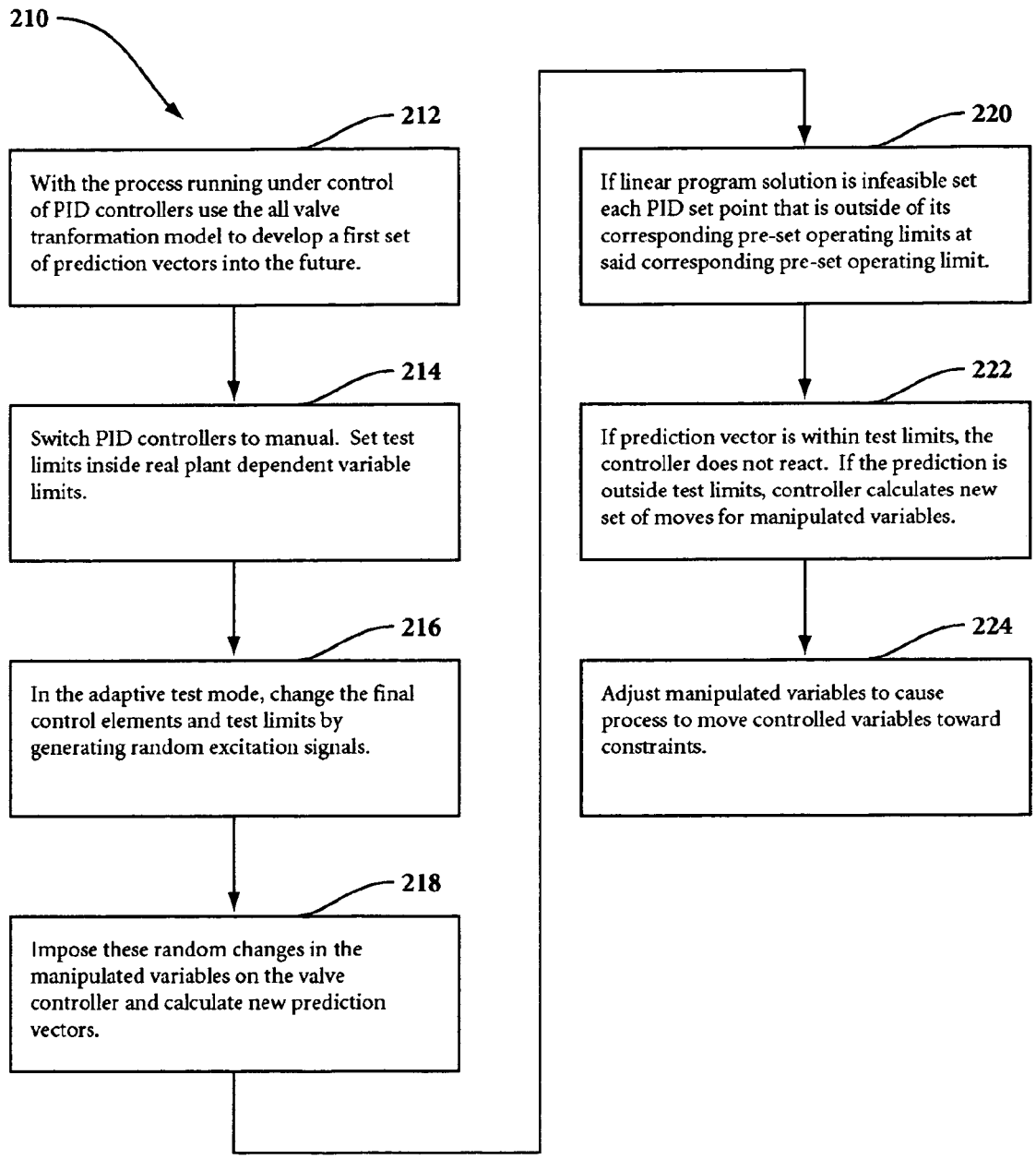
FIG. 11 is a flow sheet representation of the steps of an aspect of the inventive method.

The use of the LP constraints as just described is shown in FIG. 11, shown generally as the numeral 210. In step 212 with the process running under control of the PID controllers the all transformation valve model developed as described above is used to develop prediction vectors into the future. The adaptation step 214 then begins by placing the controller in an adaptive test mode wherein all of the PID controllers are switched to manual. In the adaptive test mode the manipulated variable final control elements and controlled variable test limits are changed 216 by generating random excitation signals that perturb those variables. Note that these manipulated variables are primarily the final control element positions. Further, the controlled variable test limits are changed randomly. For this adaptive test the test limits are inside the real plant controlled variable limits and are only considered while testing. The random changes in the manipulated variables and controlled variable test limits are imposed on the multivariable controller in step 218. The controller calculation is then made with the test limits adjusted for their random movement. When the linear program solution is infeasible each PID set point that is outside of its corresponding pre-set operating limits is set at the corresponding pre-set operating limit. When the prediction vector for each of the controlled variables is inside the test limits, step 222, the weighting factors for the equations representing the prediction vector is set to zero such that the controller considers the breadth of the test limits as the set points for the controller. When the prediction is outside the test limits the weight normally supplied for the region will be applied. Then the manipulated variables are adjusted, step 224, to cause the process to move the controlled variables toward their pre-defined constraints. In effect the controller will only react when the predicted value of a controlled variable is outside the test limits. As the adaptation continues new data is gathered from the process regarding the final control elements (for example new data on control valve positions versus flow rates). This data can be used to periodically update the piece wise linear transformations on each of the final control elements so that they represent the actual behavior of the process. All of this is possible because the open loop FIR model described earlier is very fast and is completely capable of staying ahead of the process dynamics.

While a preferred form of the invention has been disclosed and described in the specification and drawings, since variations in the preferred form will be evident to those skilled in the art, the invention should not be construed as limited to the specific forms shown and described, but instead is as set forth in the following claims when read in the light of the foregoing disclosure.

I claim:

1. A method for creating an adaptive multivariable controller for controlling a process having a plurality of independently controllable, manipulated variables, some of which are provided by the solution to a separate linear program, and at least one controlled variable dependent upon said independently controllable, manipulated variables comprising the steps of:

gathering data about said process by separately introducing test disturbances in each of said manipulated variables and measuring the effect of the disturbances on said controlled variable;

using said effects of the disturbances on said controlled variable to generate a first linearized dynamic model relating said at least one controlled variable to said independently controllable, manipulated variables;

interchanging the final control position controlled variables with their corresponding selected independently controllable, manipulated PID controller set point variables in said first linearized dynamic model using matrix row elimination mathematics to generate a second linearized dynamic model that has a new set of independently controllable, manipulated variables, said second linearized dynamic model having said selected independently controllable, manipulated PID controller set point variables removed from said second linearized dynamic model;

measuring the present value of said variables; wherein said second linearized dynamic model is the adaptive multivariable controller ready for adaptive control;

pre-setting operating limits for said at least one controlled variable;

pre-setting test limits for said at least one controlled variable that fall within said operating limits;

using the second linearized dynamic model to calculate a first set of prediction vectors for said at least one controllable variable;

placing said second linearized dynamic model in an adaptive test mode wherein all of the PID controllers are switched to manual;

perturbing the final control element manipulated variables with random excitation signals;

calculating for discrete intervals of time from said gathered data about said process, said measured present values and pre-selected operating constraints a set of moves for present and future times for at least said manipulated variables to obtain new values for said manipulated variables and to move said at least one dependent controllable variable towards at least one of said constraints;

when the linear program solution is infeasible, setting each PID set-point that is outside of its corresponding pre-set operating limits at said corresponding pre-set operating limit; and when the prediction vector is outside of test limits for said at least one controlled variable, changing said process by adjusting said manipulated variables for said set of moves for present and future times to cause said process to move said at least one dependent controllable variable towards at least one of said constraints.

2. The method of claim 1, wherein said perturbing step additionally comprises perturbing said test limits for said at least one controlled variable with random excitation signals.

3. The method of claim 1, wherein said process comprises at least one uncontrolled variable that is dependent on said manipulated variables and wherein said step of calculating said set of moves for present and future times further comprises calculating said set of moves such that said at least one uncontrolled variable is limited to a predetermined constraint.

4. The method of claim 2, wherein said process comprises at least one uncontrolled variable that is dependent on said manipulated variables and wherein said step of calculating said set of moves for present and future times further comprises calculating said set of moves such that said at least one uncontrolled variable is limited to a predetermined constraint.

5. The method of claim 3, wherein said step of calculating said set of moves for present and future times further comprises calculating said set of moves such that at least one of said manipulated variables is limited to a predetermined constraint.

6. The method of claim 4, wherein said step of calculating said set of moves for present and future times further comprises calculating said set of moves such that at least one of said manipulated variables is limited to a predetermined constraint.

7. The method of claim 1, wherein said step of calculating said set of moves for present and future times comprises calculating said set of moves employing quadratic programming techniques.

8. The method of claim 7, wherein said step of calculating said set of moves for present and future times further comprises calculating said set of moves such that at least one of said manipulated variables is limited to a predetermined constraint.

9. The method of claim 7, wherein said process comprises at least one uncontrolled variable that is dependent on said manipulated variables and wherein said step of calculating said set of moves for present and future times further comprises calculating said set of moves such that said uncontrolled variable is limited to a predetermined constraint.

10. The method of claim 1, wherein said step of calculating said set of moves for present and future times comprises calculating said set of moves employing linear programming techniques.

11. The method of claim 10, wherein said step of calculating said set of moves for present and future times further comprises calculating said set of moves such that at least one of said manipulated variables is limited to a predetermined constraint.

12. The method of claim 10, wherein said process comprises at least one uncontrolled variable that is dependent on said manipulated variables and wherein said step of calculating said set of moves for present and future times further comprises calculating said set of moves such that said uncontrolled variable is limited to a predetermined constraint.

13. The method of claim 1, wherein said step of calculating said set of moves further comprises calculating said set of moves such that at least one of said manipulated variables is limited to a predetermined constraint.

14. The method of claim 13, wherein said process comprises at least one uncontrolled variable that is dependent on said manipulated variables and wherein said step of calculating said set of moves for present and future times further comprises calculating said set of moves such that said uncontrolled variable is limited to a predetermined constraint.

15. A method for creating an off-line process simulator for use in process simulation and for training simulators for a process by use of the adaptive multivariable controller model created by the method of claim 1 comprising the steps of:
   a. porting said adaptive multivariable controller to a computer;
   b. coupling regulatory control schemes to said adaptive multivariable controller model via mathematical emulators to emulate PID controllers in manual, cascade, or automatic modes to create a completed model; and
   c. initializing said completed model with initial conditions; and mathematically solving said completed model to predict future variable states.

16. A method for creating an on-line operator advisor for use in process simulation and for training simulators for a process by use of the adaptive multivariable controller created by the method of claim 1 comprising the steps of:
   a. coupling regulatory control schemes to said adaptive multivariable controller model via mathematical emulators to emulate PID controllers in manual, cascade, or automatic modes to create a completed model;
   b. accessing real time data from said process to initialize said completed model with the state of the manipulated and controlled variables;
   c. initializing the configuration and tuning of the regulatory control system;
   d. initializing with the state of the open loop final control element prediction vectors and;
   e. mathematically solving said completed model to predict the future path of said at least one controlled variable.

* * * * *